United States Patent
Okamoto

(10) Patent No.: US 10,295,364 B2
(45) Date of Patent: May 21, 2019

(54) OBSTACLE DATA PROVIDING SYSTEM, DATA PROCESSING APPARATUS AND METHOD OF PROVIDING OBSTACLE DATA

(71) Applicant: ALPINE ELECTRONICS, INC., Tokyo (JP)

(72) Inventor: Hideki Okamoto, Fukushima (JP)

(73) Assignee: ALPINE ELECTRONICS, INC., Tokyo (JP)

(*) Notice: Subject to any disclaimer, the term of this patent is extended or adjusted under 35 U.S.C. 154(b) by 0 days.

(21) Appl. No.: 15/953,827

(22) Filed: Apr. 16, 2018

(65) Prior Publication Data

US 2018/0340794 A1    Nov. 29, 2018

(30) Foreign Application Priority Data

May 26, 2017 (JP) .................. 2017-104501
Mar. 14, 2018 (JP) .................. 2018-046475

(51) Int. Cl.
| | |
|---|---|
| B60Q 1/00 | (2006.01) |
| G01C 21/36 | (2006.01) |
| G06T 11/60 | (2006.01) |
| G06T 3/40 | (2006.01) |
| G01C 21/32 | (2006.01) |
| G01C 21/34 | (2006.01) |
| G06F 3/0481 | (2013.01) |
| A61H 3/06 | (2006.01) |

(52) U.S. Cl.
CPC ......... *G01C 21/3697* (2013.01); *G01C 21/32* (2013.01); *G01C 21/3461* (2013.01); *G01C 21/3664* (2013.01); *G06T 3/40* (2013.01); *G06T 11/60* (2013.01); *A61H 3/066* (2013.01); *G06F 3/04817* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 6,539,294 | B1 * | 3/2003 | Kageyama | E02F 3/842 180/168 |
| 2005/0107952 | A1 * | 5/2005 | Hoshino | G01C 21/36 701/431 |
| 2006/0047361 | A1 * | 3/2006 | Sato | B25J 5/007 700/245 |

(Continued)

FOREIGN PATENT DOCUMENTS

| | | |
|---|---|---|
| JP | 2010-020702 | 1/2010 |
| JP | 2012-098939 | 5/2012 |

*Primary Examiner* — Julie B Lieu
(74) *Attorney, Agent, or Firm* — Ipusa, PLLC

(57) ABSTRACT

An obstacle data providing system includes a data processing apparatus that includes an electronic data providing unit that refers to an obstacle data storage unit that stores obstacle data generated by synthesizing a plurality of obstacle factors each of which becomes an obstacle in travelling of a low-speed vehicle, and sends, upon receiving a request for an electronic map from a terminal device, the obstacle data to the terminal device with an electronic map via a network; and the terminal device that includes a receiving unit that receives the electronic map and the obstacle data, and a display unit that displays the obstacle data with the electronic map, received by the receiving unit, on a display.

13 Claims, 21 Drawing Sheets

(56) References Cited

U.S. PATENT DOCUMENTS

| | | | |
|---|---|---|---|
| 2006/0058921 A1* | 3/2006 | Okamoto | G05D 1/0214 700/255 |
| 2006/0064203 A1* | 3/2006 | Goto | G05D 1/0246 700/245 |
| 2007/0124024 A1* | 5/2007 | Okamoto | B25J 5/007 700/245 |
| 2010/0030417 A1* | 2/2010 | Fang | G05D 1/0274 701/25 |
| 2014/0210820 A1* | 7/2014 | Inakoshi | G06T 17/20 345/423 |
| 2015/0284010 A1* | 10/2015 | Beardsley | B60W 50/10 701/41 |
| 2017/0295457 A1* | 10/2017 | Mappus, IV | H04W 4/02 |
| 2017/0299397 A1* | 10/2017 | Ichikawa | B60R 11/04 |
| 2018/0025235 A1* | 1/2018 | Fridman | G08G 1/096725 382/103 |
| 2018/0267540 A1* | 9/2018 | Sonoura | G05D 1/0088 |

* cited by examiner

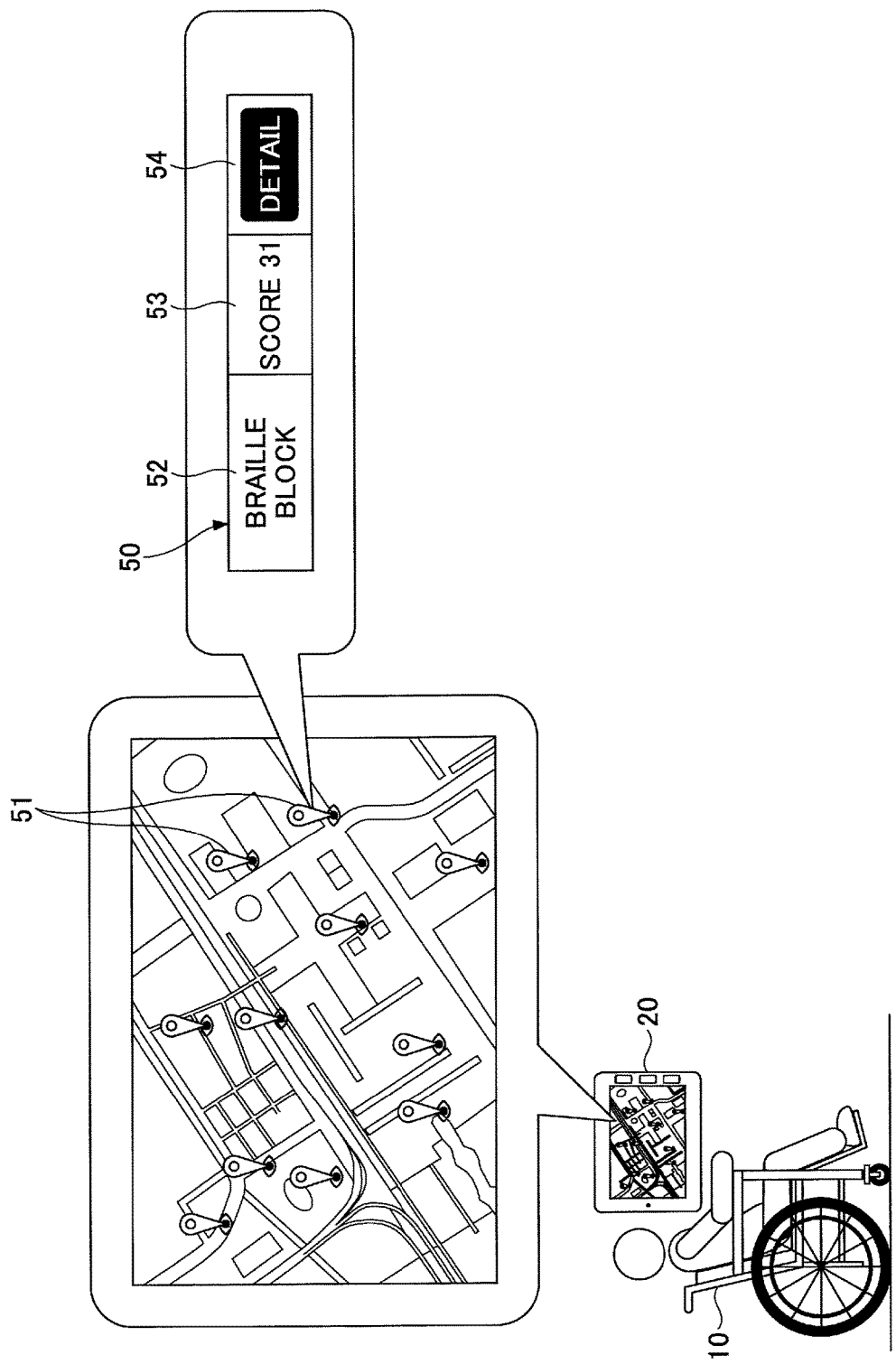

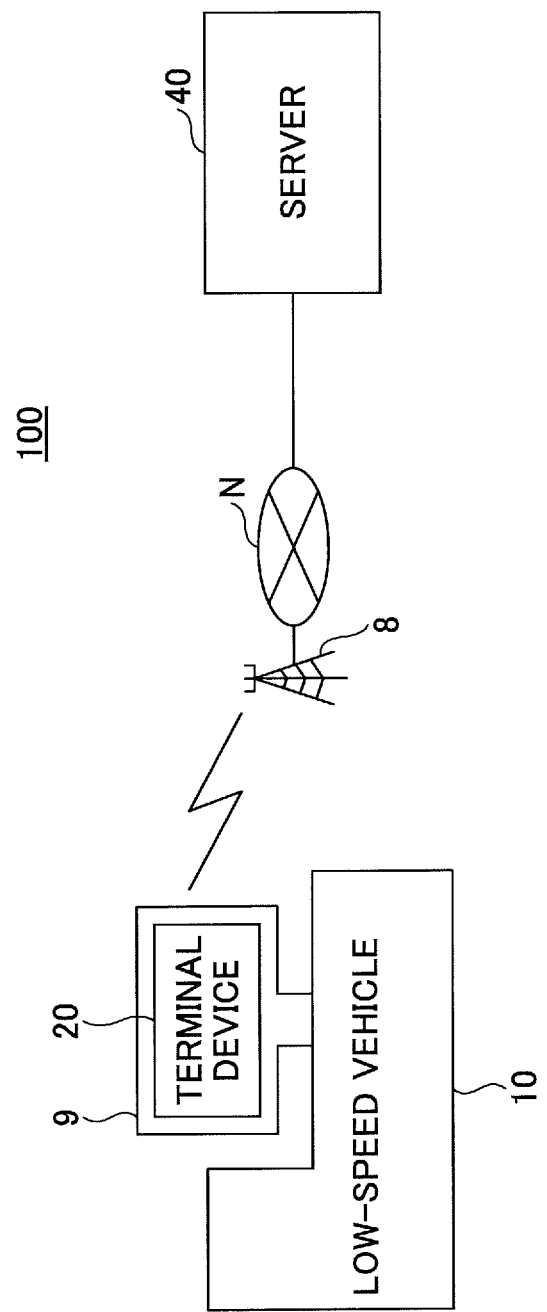

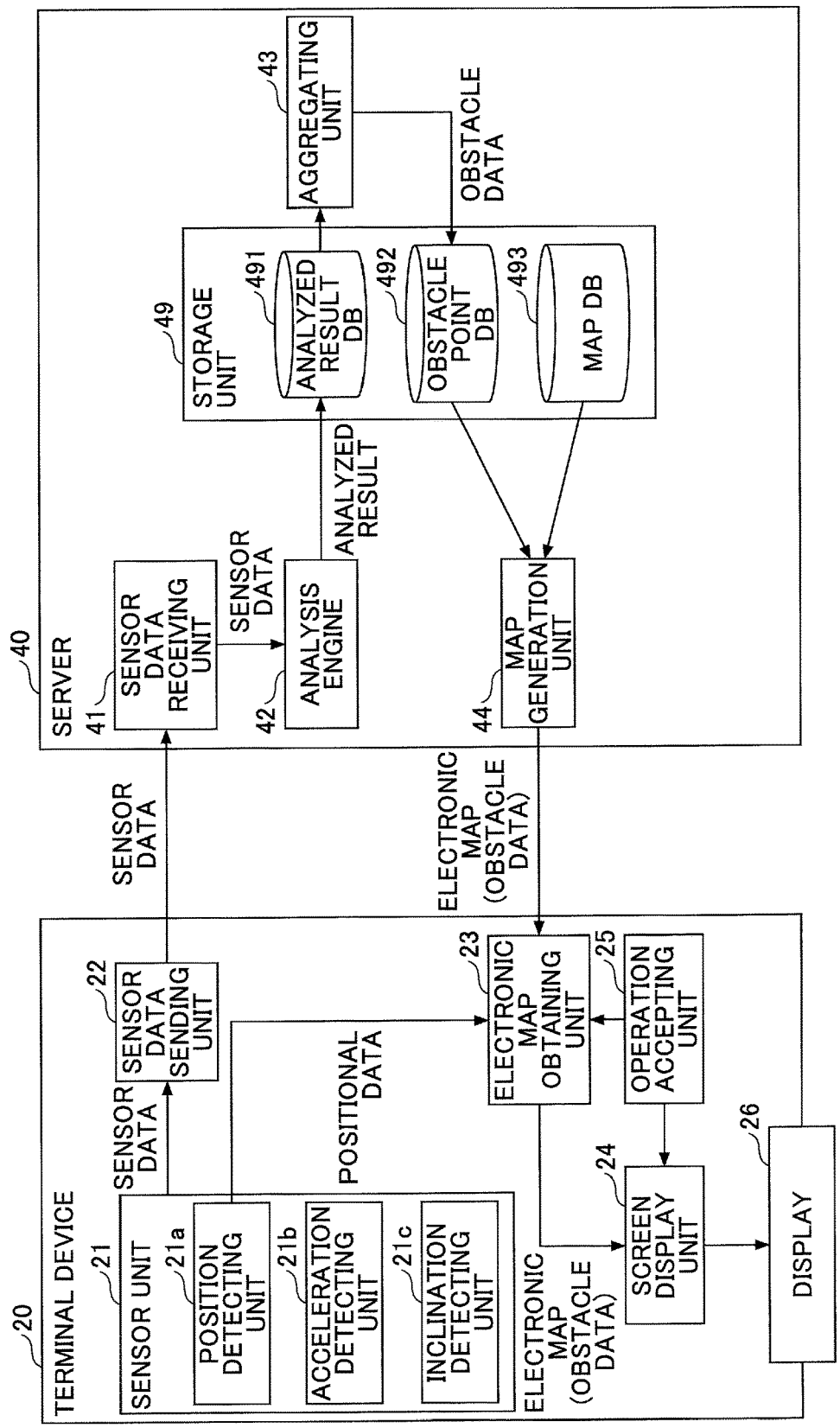

OBSTACLE DATA PROVIDING SYSTEM, DATA PROCESSING APPARATUS AND METHOD OF PROVIDING OBSTACLE DATA

CROSS-REFERENCE TO RELATED APPLICATION

The present application is based on and claims the benefit of priority of Japanese Priority Application No. 2017-104501 filed on May 26, 2017, and Japanese Priority Application No. 2018-46475 filed on Mar. 14, 2018, the entire contents of which are hereby incorporated by reference.

BACKGROUND OF THE INVENTION

1. Field of the Invention

The present invention relates to an obstacle data providing system, a data processing apparatus and a method of providing obstacle data.

2. Description of the Related Art

A technique is known in which sensor data, obtained by various sensors while a vehicle travels, is sent to a server, and the server detects an obstacle on a road, or generates a congestion condition of a road. Such a method of collecting data in which a vehicle itself functions as sensors is referred to as a data collection by a probe car by emulating a probe sensor (which is an instrument that measures properties of an object by closely contacting the object (see Patent Document 1, for example).

Such a data collection by the probe car is applicable for a low-speed vehicle such as a wheel chair, in addition to a general vehicle. Patent Document 2 discloses a technique in which barrier data are automatically collected by a travelling low-speed vehicle, and e barrier data are associated with map data. Specifically, it is described in Patent Document 2 that a low-speed vehicle includes a position detection part which detects a travelling position of its own vehicle; barrier information creation parts which automatically create the barrier information based on vibration or inclination caused in its own vehicle during travelling or based on both; and a cellular phone that is a data transmitting part for transmitting the probe information including the travelling position and the barrier information to the server device.

However, according to the system described in Patent Document 2, there is a problem that obstacle factors are separately provided.

PATENT DOCUMENTS

[Patent Document 1] Japanese Laid-open Patent Publication No. 2012-98939
[Patent Document 2] Japanese Laid-open Patent Publication No. 2010-20702

SUMMARY OF THE INVENTION

The present invention is made in light of the above problems, and provides an obstacle data providing system that provides obstacle data regarding multiple obstacle factors.

According to an embodiment, there is provided an obstacle data providing system including a data processing apparatus that includes an electronic data providing unit that refers to an obstacle data storage unit that stores obstacle data generated by synthesizing a plurality of obstacle factors each of which becomes an obstacle in travelling of a low-speed vehicle, and sends, upon receiving a request for an electronic map from a terminal device, the obstacle data to the terminal device with an electronic map via a network; and the terminal device that includes a receiving unit that receives the electronic map and the obstacle data, and a display unit that displays the obstacle data with the electronic map, received by the receiving unit, on a display.

BRIEF DESCRIPTION OF THE DRAWINGS

FIG. 1 is a view for describing an example of obstacle data provided by an obstacle data providing system;
FIG. 2 is a view illustrating an example of a system structure of the obstacle data providing system;
FIG. 3 is a functional block diagram illustrating an example of functions of a terminal device and a server by blocks.

DETAILED DESCRIPTION

Figure 4A:
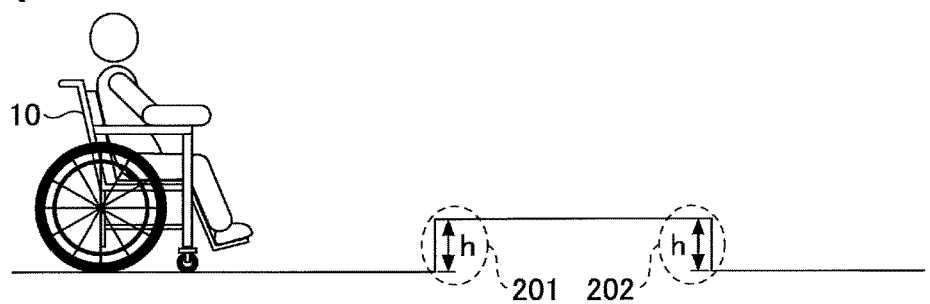
FIG. 4A to FIG. 4D are views for describing examples of types of obstacle factors determined at the server.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

As a low-speed vehicle such as a wheel chair moves a same place as a pedestrian in a different way from the pedestrian such as rotating tires, there are obstacles in travelling different from those for the pedestrian. For example, there may be difficulties for the low-speed vehicle, different from difficulties for the pedestrian, in overpassing a step, moving a slope, passing a narrow passage, travelling a place with a specific road surface and the like. Thus, when the low-speed vehicle functions as a probe car, a server detects obstacle factors specific for the low-speed vehicle.

The server associates places that may be obstacles in travelling by a low-speed vehicle with map data. A user of the low-speed vehicle can move by avoiding obstacle factors by obtaining places that may be obstacles with an electronic map from the server.

Here, there are a lot of landforms where multiple obstacle factors such as both of a step and an inclination exist. Generally, it may be difficult for a low-speed vehicle to travel at a place where multiple obstacle factors exist compared with a place where a single obstacle factor exists. For example, if only a step exists, a wheel chair may overpass, however, if an inclination also exists, the wheel chair may not be able to overpass the step. Thus, according to the embodiment, it is desired that a server detects multiple obstacle factors from each landform, and provides data indicating existence of multiple obstacle factors and the like to a user of a low-speed vehicle.

Hereinafter, an obstacle data providing system and a method of providing obstacle data are described as an example of an embodiment with reference to drawings.

Example 1

(Example of Obstacle Data to be Provided)

FIG. 1 is a view for describing an example of obstacle data provided by an obstacle data providing system of the embodiment. A terminal device 20 is mounted on a low-speed vehicle 10 such as a wheel chair, and obstacle data is provided with an electronic map to the terminal device 20.

As will be described later, the electronic map displayed by the terminal device 20 is sectioned into meshes of a predetermined range. Further, a score (difficulty data) indicating difficulty in travelling is associated with each of the meshes. The score is calculated based on a plurality of detected obstacle factors.

The terminal device 20 displays pin icons 51 each having a configuration (appearance such as a color or a shape) corresponding to a value of the respective score. Thus, a user can estimate whether the user can travel or not by colors, for example, of the pin icons 51.

Further, the user can press the pin icon 51 in the electronic map at a place where the user wants to travel. As illustrated in FIG. 1, the terminal device 20 displays a detail 50 of the obstacle data associated with the pin icon 51 in a pop-up manner, for example. The detail 50 of the obstacle data includes a score 53 that is associated with the respective mesh. The user can determine whether the user can travel or not by seeing a tangible value of the score. Further, the detail 50 of the obstacle data includes a maximum obstacle factor 52 that indicates a factor that influences most on the score, among multiple obstacle factors. For the example illustrated in FIG. 1, a "braille block" is the maximum obstacle factor 52 that influences most on the score. Thus, the user can determine whether to use the road by confirming the tangible obstacle factor. Further, the detail 50 of the obstacle data includes a detail button 54. When the user presses the detail button 54, further detail information of the obstacle data that is associated with the mesh is displayed.

As such, as the obstacle data providing system of the embodiment provides obstacle data obtained by synthesizing the multiple obstacle factors, the user of the low-speed vehicle 10 can easily recognize difficulties of travelling at a place with the multiple obstacle factors.

(Terms)

An "obstacle in travelling" is a type of landform that can be an intercept, a disturbance or a barrier in travelling. This may be different in accordance with the type of the low-speed vehicle.

An "obstacle factor" is a tangible factor or a cause of an obstacle. In many cases, the obstacle factor is based on the landform. However, it is unnecessary for the obstacle factor to be fixed to a place, and may be based on a building, a construction and the like. In this embodiment, a step, a vertical inclination, a lateral inclination, a narrow road and an irregularity of a road surface are exemplified as an example of the obstacle factor.

Further, "synthesizing a plurality of obstacle factors" means to synthesize difficulties in travelling based on the plurality of obstacle factors into one result.

"Obstacle data" is data regarding obstacles in travelling. Preferably, the "obstacle data" includes at least one of a degree of a difficulty in travelling, and data regarding obstacle factors. The "difficulty in travelling" means a size of the obstacle in travelling, a degree of hardness in travelling, or a degree of difficulty in travelling.

Data regarding travelling of the low-speed vehicle may be any data appropriate for analyzing the obstacle factors. For example, acceleration, inclination and positional data may be exemplified.

(Example of System Structure)

FIG. 2 is a view illustrating an example of a system structure of an obstacle data providing system 100. The obstacle data providing system 100 includes a server 40 and the terminal device 20 that is mounted on the low-speed vehicle 10. The server 40 and the terminal device 20 communicate with each other via a network N.

In the obstacle data providing system 100 of the embodiment, the low-speed vehicle 10 functions as a probe car. The probe car means a vehicle itself in a method of collecting data in which the vehicle itself functions as sensors. The terminal device 20 includes various sensors, which will be described later, for detecting obstacles. The terminal device 20 sends sensor data detected by the sensors to the server 40 with positional data. The server 40 processes the sensor data to generate obstacle data, and sends the obstacle data to the terminal device 20 with an electronic map.

The network N includes a public network such as a mobile phone network, a wireless LAN network or a WiMAX communication network provided by a communication company, and a provider network provided by a provider (a company that provides a service to connect devices to the Internet). A base station 8 is connected to the network N for connecting the terminal device 20 to the public network of the communication company. A network in a facility such as a LAN may be included in the network N.

The server 40 is a data processing apparatus having a communication function. The server 40 is configured by, for example, a data processing apparatus, a personal computer, a workstation or the like, provided for a server. The server 40 includes a CPU, a high-speed memory (RAM) used by the CPU to execute a program, a ROM that stores BIOS (Basic Input/Output System) and the like, an auxiliary memory such as a HDD (Hard Disk Drive) that stores a program or the like, a network I/F (interface) for connecting to the network N, and the like. In addition, the server 40 may include a graphics I/F that generates a screen on a display connected to the server 40, and an input device such as a keyboard or a mouse that accepts an input by an operator.

The low-speed vehicle 10 is a vehicle that mainly travels a place same as a pedestrian at a low speed. The low-speed vehicle 10 is a vehicle that travels at a speed lower than a general vehicle that includes a power and travels at a high speed such as a vehicle with a reciprocating engine, an electric vehicle (EV), a hybrid electric vehicle (HV), a plug in hybrid electric vehicle (PHV), a fuel cell powered vehicle (FCV) or an auto-bicycle. In this embodiment, a wheel chair is exemplified as an example of the low-speed vehicle 10. As the wheel chair is moved by a user on the wheel chair or by a caregiver who pushes the wheel chair from the back of the user, the wheel chair moves relatively at a low speed. Although there is a wheel chair moved by a motor, power of the motor is not so large, and it still moves at a lower speed compared with the general vehicle.

Alternatively, the low-speed vehicle 10 may be a light vehicle. According to the Road Traffic Law, the light vehicle is a bicycle, a cart, or a vehicle (including a sled, a horse and a cow) driven by a power of a human or an animal, or drawn by another vehicle without using a rail. For example, a rear car or a jinrikisha (riksha) is also the light vehicle. Here, the wheel chair is treated similarly as a pedestrian at law.

The terminal device 20 is mounted on the low-speed vehicle 10 via an attachment 9. The attachment 9 is an instrument or a container that can retain the terminal device 20 at the same attitude. As the terminal device 20 is required to detect inclination or the like at a place where the low-speed vehicle 10 travels, the same attitude is required. Preferably, the attachment 9 fixes the terminal device 20 such that the user who sits on the wheel chair can view a display 26 of the terminal device 20 with a small movement of eyes.

The terminal device 20 is a data processing apparatus that includes a function to communicate with the server 40, sensors for detecting obstacle data and the like. For example, a smartphone, a tablet terminal, a Personal Digital Assistant (PDA), a mobile phone, a note PC (Personal Computer) or the like is exemplified as the terminal device 20. The terminal device 20 executes browser software or application software. The browser software is software for connecting to a desired URL (Uniform Resource Locator) and display a Web page, and displays the obstacle data with the electronic map by communicating with the server 40. The application software is dedicated software for displaying the electronic map, and displays the obstacle data with the electronic map by communicating with the server 40. In both cases, the software includes a navigation function. The navigation function is a function to display an electronic map around the low-speed vehicle 10 on the display of the terminal device 20, and also navigate a route from a starting point to a destination.

The terminal device 20 may be a general-purpose data processing apparatus, or may be a dedicated terminal for navigation. The dedicated terminal for navigation is also referred as a Portable Navigation Device (PND). In addition, an apparatus that is mainly used for another purpose (a music player, a game device or the like, for example) may be used as the terminal device 20.

At both cases, the terminal device 20 may switchably take a status in which being mounted on the low-speed vehicle 10a and a mobile status. In other words, the terminal device 20 is detachably mounted on the low-speed vehicle 10.

The terminal device 20 includes a CPU, a RAM, a ROM, a HDD, a display, an input device such as a touch panel or a voice recognition device, a communication device for communicating with the base station 8 and the like. The terminal device 20 further includes sensors for detecting obstacle data. The sensors may be, for example, a three-axis acceleration sensor, a gyro sensor for detecting an attitude, an azimuth sensor for detecting an azimuth such as north, south, east and west, a GPS (Global Positioning System) receiver for detecting a present point and the like.

(Functions)

FIG. 3 is a functional block diagram illustrating an example of functions of the terminal device 20 and the server 40 by blocks.

(Terminal Device)

The terminal device 20 includes a sensor unit 21, a sensor data sending unit 22, an electronic map obtaining unit 23, an operation accepting unit 25 and a screen display unit 24. These functions of the terminal device 20 respectively illustrated as blocks in FIG. 3 are functions or means actualized by operations of any of hardware resources of the terminal device 20 caused by instructions from the CPU which follows a program developed on the RAM from the HDD. The program executed by the terminal device 20 may be delivered from a server that provides programs or may be obtained under a status being stored in a recording medium.

The sensor unit 21 further includes a position detecting unit 21a, an acceleration detecting unit 21b and an inclination detecting unit 21c. The position detecting unit 21a detects a present point of the terminal device 20 as positional data. The position detecting unit 21a periodically detects a present point and estimates a corresponding position on the electronic map by dead reckoning, map matching or the like. The position detecting unit 21a may be actualized by, for example, controlling a GPS receiver by the CPU.

The acceleration detecting unit 21b detects acceleration at least in a vertical direction (upper-lower direction), preferably, accelerations generated in a vertical direction, a first lateral direction (right-left direction) and a second lateral direction that is perpendicular to the first lateral direction (front-rear direction). The acceleration detecting unit 21b may be actualized by, for example, controlling a three-axis acceleration sensor by the CPU.

The inclination detecting unit 21c detects an inclination of the terminal device 20 by integrating angular speeds generated in the terminal device 20. Specifically, the inclination detecting unit 21c detects a roll angle, a pitch angle and a yaw angle. The inclination detecting unit 21c may be actualized by, for example, controlling a gyro sensor by the CPU.

Each of the position detecting unit 21a, the acceleration detecting unit 21b and the inclination detecting unit 21c of the sensor unit 21 periodically detects data, and sends the data to the sensor data sending unit 22. Hereinafter, positional data detected by the position detecting unit 21a, acceleration data detected by the acceleration detecting unit 21b and inclination data detected by the inclination detecting unit 21c are referred to as "sensor data" in total.

The sensor data sending unit 22 sends the sensor data to the server 40 at timing when the sensor data is detected. When there is a demerit such as a load of the terminal device 20 becomes large in sending the sensor data at timing when the sensor data is detected, the sensor data may be sent at each predetermined period, every time a predetermined amount of sensor data is accumulated, or at timing when the load of the terminal device 20 is small. The predetermined period may be approximately a few seconds to a minute, however, as it is unnecessary for the sensor data to be sent at real-time, the predetermined period may be appropriately determined while considering a process load and the like.

The operation accepting unit 25 accepts various operations to the terminal device 20 by the user. For example, the operation accepting unit 25 accepts an operation regarding display of the obstacle data. Further, the operation accepting unit 25 accepts an input of a destination for searching a route from the user, and when necessary, accepts an input of a starting point other than a present point. Further, the operation accepting unit 25 accepts instructions such as a start of route guidance, an instruction of reroute, an instruction to scale up or scale down of the electronic map and an instruction to change a display range.

The electronic map obtaining unit 23 sends positional data detected by the position detecting unit 21a to the server 40, and obtains an electronic map and the obstacle data of a periphery of the present point. Further, in accordance with operations accepted by the operation accepting unit 25, the electronic map obtaining unit 23 sends various requests to the server 40 such as a request of searching a route, and a request of updating the electronic map. Then, the electronic map obtaining unit 23 obtains the obstacle data from the server 40 with the electronic map. When the electronic map obtaining unit 23 sends the request of searching a route, the electronic map obtaining unit 23 obtains route data as well. The route data is information for indicating junctions, travelling directions and the like when a user proceeds along the route.

The screen display unit 24 generates a navigation screen (a screen to guide a user to a destination) by using the electronic map, various buttons, texts and icons, and displays it on the display 26. Further, when the operation accepting unit 25 accepts an operation to the navigation screen, the screen display unit 24 changes the navigation screen in accordance with the operation.

Although the terminal device 20 obtains the electronic map from the server 40 in FIG. 3, the terminal device 20 may include a map DB 493 same as that of the server 40, and the terminal device 20 may generate the electronic map. In such a case, the screen display unit 24 incorporates the obstacle data sent from the server 40 into the electronic map.

(Server)

The server 40 includes a sensor data receiving unit 41, an analysis engine 42, an aggregating unit 43 and a map generation unit 44. These functions of the server 40 respectively illustrated as blocks in FIG. 3 are functions or means actualized by operations of any of hardware resources of the server 40 caused by instructions from the CPU which follows a program developed on the RAM from the HDD. The program executed by the server 40 may be delivered from a server that provides programs or may be obtained under a status being stored in a recording medium.

Further, the server 40 includes a storage unit 49 constructed by a HDD, a ROM, a RAM or the like. The storage unit 49 includes an analyzed result DB 491, an obstacle point DB 492, and a map DB 493. The server 40 may not include these DBs, and these DBs may be provided at sites on the network N that are accessible by the server 40. The analyzed result DB 491 is described with reference to Table 1. The obstacle point DB 492 is described with reference to Table 2. The map DB 493 includes map data for displaying (drawing) the electronic map. Information displayed in the electronic map include many displayed objects such as blocks such as prefectures, green spaces and rivers, roads and railroads and marks and notes. Thus, objects having similar characters are categorized in a same group and the objects in each of the groups are illustrated. A group of the displayed objects categorized in the same group or a status in which such displayed objects are illustrated are referred to as a layer, and the electronic map is illustrated by overlapping a plurality of layers.

The sensor data receiving unit 41 receives sensor data from the terminal device 20, and sends them to the analysis engine 42.

The analysis engine 42 stores the sensor data, and analyzes whether obstacle factor(s) exist every predetermined period "T". The predetermined period "T" is, for example, a few seconds, and one analysis is performed on sensor data of a few seconds obtained by one of the terminal devices 20. For example when the predetermined period "T" is five seconds, one analyzed result (determination of existence of obstacle factor(s)) is obtained for an analysis of the sensor data for five seconds. Although this analysis is described later in detail, by the analysis, whether obstacle factor(s) exist by the analysis, and, when obstacle factor(s) are detected, individual attribute data of each of the detected obstacle factor(s) are determined. The analyzed results are stored in the analyzed result DB 491. An example of the analyzed result is illustrated in Table 1.

TABLE 1

| | |
|---|---|
| MANAGEMENT ID | 001 |
| MESH CODE | M001 |
| DETECTED POINT | LATITUDE, LONGITUDE |
| DETECTED DATE AND TIME | 2017 May 5/10:10:35 |
| OBSTACLE FACTOR | STEP, VERTICAL INCLINATION, LATERAL INCLINATION, NARROW ROAD, IRREGULARITY |
| AZIMUTH | DIRECTION OF TRAVELLING WHEN OBSTACLE FACTOR IS DETECTED |
| INDIVIDUAL ATTRIBUTE DATA | STEP: HEIGHT VERTICAL INCLINATION: DEGREE A LATERAL INCLINATION: DEGREE B NARROW ROAD: — IRREGULARITY: BRAILLE BLOCK, BALLAST, SOIL, FLAT |

Table 1 illustrates an example of the analyzed result. The analyzed result includes items such as management ID, a mesh code, a detected point, detected date and time, an obstacle factor, azimuth, and individual attribute data. The management ID is identification data for uniquely identifying the analyzed result. The ID is an abbreviation of Identification, and means an identifier or identification data. Tue ID is a name, a code, a character string, a numerical value or a combination of two or more of these used for uniquely identifying a specific object from a plurality of objects.

The mesh code is identification data of each of the meshes sectioning a ground surface. The mesh is a foursquare rectangular shape area, where a length of one side is set as an appropriate length for aggregation of the obstacle data. The length of one side is, for example, approximately 10 meters, 5 meters, or greater than 10 meters. When the length is extremely short, the number of meshes becomes too much and the number of obstacle data (pin icons 51) becomes too much when viewing the electronic map. On the other hand, when the length is extremely long, even when the pin icon 51 is displayed for a mesh in the electronic map, a situation may occur in which an obstacle only exists at a part in the mesh.

The detected point is positional data (latitude, longitude) included in the sensor data. The detected point may be an average of the positional data over the predetermined period "T".

The detected date and time is date and time when the sensor data is detected. For example, the detected date and time is an average of detected date and time of various data included in a single set of sensor data, date and time when the terminal device 20 sends the sensor data, date and time when the server 40 receives the sensor data or the like.

The obstacle factor is a factor of an obstacle that is determined to exist by the analysis. In this embodiment, a step, a vertical inclination, a lateral inclination, a narrow road, and an irregularity are exemplified as the obstacle factor. Only the obstacle factors that are determined to exist are registered in the analyzed result.

The "azimuth" indicates a direction of the travelling of the low-speed vehicle 10 when the obstacle factor is detected. For example, the "azimuth" has a value 0 degree for a north direction, and the value increases in a clockwise direction up to 359 degree at maximum. The "azimuth" is registered for each of the obstacle factors.

The individual attribute data is attribute data regarding the obstacle factor that is determined to exist. For example, the attribute data of the "step" is a height, the attribute data of each of the "vertical inclination" and the "lateral inclination" is an angle, and the attribute data of the "irregularity" is a type of a road surface, either of "braille block", "ballast", "soil" and "flat". As only existence is determined for the "narrow road", the individual attribute data may not be included.

Referring back to FIG. 3, the aggregating unit 43 aggregates obstacle factors for each of the meshes, and generates obstacle data for each of the meshes. An example of the obstacle data is illustrated in Table 2.

TABLE 2

| MESH CODE | M001 |
|---|---|
| CENTER COORDINATE | LATITUDE, LONGITUDE |
| CONTRIBUTION RATIO FOR EACH FACTOR | STEP:CONTRIBUTION RATIO<br>VERTICAL INCLINATION:CONTRIBUTION RATIO<br>LATERAL INCLINATION:CONTRIBUTION RATIO<br>NARROW ROAD:CONTRIBUTION RATIO<br>IRREGULARITY:CONTRIBUTION RATIO |
| SCORE | 31 |
| AZIMUTH | AVERAGE OF AZIMUTH OF DETECTED EACH OBSTACLE FACTOR |
| INDIVIDUAL ATTRIBUTE DATA | STEP: HEIGHT<br>VERTICAL INCLINATION: DEGREE A<br>LATERAL INCLINATION: DEGREE B<br>NARROW ROAD: —<br>IRREGULARITY: BRAILLE BLOCK, BALLAST, SOIL, FLAT |

Table 2 illustrates an example of the obstacle data. The obstacle data includes items such as a mesh code, a center coordinate, a contribution ratio for each factor, a score, azimuth, and individual attribute data. The mesh code is same as that of Table 1. The center coordinate is a center coordinate of the mesh. The contribution ratio for each factor is a contribution ratio of each of the obstacle factors to the score. Thus, when the contribution ratio of the obstacle factor is larger, that means that the obstacle factor is a significant obstacle in the mesh. The score indicates a difficulty in travelling for the low-speed vehicle 10 to travel in the mesh. The score takes a value within a certain range, and a user can determine how high the difficulty in travelling of the mesh by the score. Although an example in which the score takes a value from 0 to 100 is described here, the score may be set to take 10 steps from 1 to 10, or three steps of A, B and C. The azimuth is an average value of azimuths of each of the obstacle factors detected in the respective mesh. The individual attribute data of the obstacle data is an average value of the individual attribute data of the same obstacle factor detected in the respective mesh.

Referring back to FIG. 3, the map generation unit 44 generates an electronic map of a periphery of the present point sent from the terminal device 20, by using the map data stored in the map DB 493. In this embodiment, the map generation unit 44 further attaches the obstacle data stored in the obstacle point DB 492 to the electronic map. As the obstacle data is generated for each of the meshes, the map generation unit 44 illustrates a pin icon 51 of a color corresponding to a value of the score at a center of the mesh whose score is greater than or equal to a predetermined value, for example. The obstacle data as illustrated in Table 2 is associated with the pin icon 51.

(Example of Obstacle Factor)

Next, an example of the obstacle factor determined by the server 40 of the embodiment is described with reference to FIG. 4A to FIG. 5C.

"Step"

FIG. 4A illustrates an example of an obstacle factor called a "step". The "step" means that a height drastically changes when travelling. There is a case that a height becomes higher as illustrated as a step 201, and a case that a height becomes lower as illustrated as a step 202. The attribute data of the step is a height "h" of the step 201 and a height "h" of the step 202. Here, although the height of the step 202 is calculated as a minus value, plus and minus are not differentiated in this embodiment. This is because the low-speed vehicle 10 may travel in various directions, and it is unnecessary to determine the plus and minus.

"Vertical Inclination"

Figure 4B:
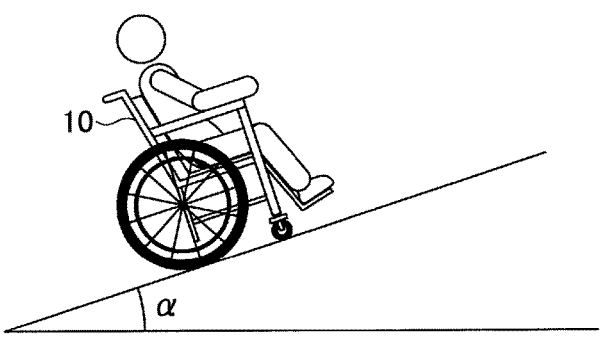

FIG. 4B illustrates an example of an obstacle factor called a "vertical inclination". The "vertical inclination" means that a height gradually changes in a travelling direction. An angle "a" in FIG. 4B is a vertical inclination. There is an ascent vertical inclination where a height gradually increases, and a descent vertical inclination where a height gradually decreases. Although the ascent vertical inclination and the descent vertical inclination can be determined based on the inclination data, plus and minus are not differentiated in this embodiment.

"Lateral Inclination"

Figure 4C:
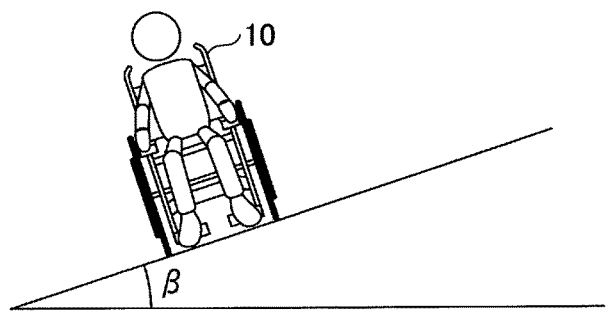

FIG. 4C illustrates an example of an obstacle factor called a "lateral inclination". The "lateral inclination" means that a height continuously changes in a direction perpendicular to the travelling direction. An angle "β" in FIG. 4C is a lateral inclination. There is a right downward lateral inclination and a left downward lateral inclination. However, the right downward inclination and the left downward lateral inclination are not differentiated in this embodiment.

"Narrow Road"

Figure 4D:
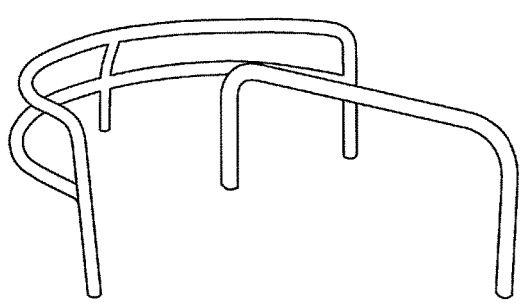

FIG. 4D illustrates an example of an obstacle factor called a "narrow road". The "narrow road" means a passage whose width is narrower with respect to a lateral width of the low-speed vehicle 10. For example, when the low-speed vehicle 10 is a wheel chair, a passage whose width is approximately one meter is a narrow road. FIG. 4D illustrates a vehicle stop at a park as an example of the narrow road. As such, a narrow road is often curved. It is hard for the low-speed vehicle 10 to pass a narrow road because it is hard for the low-speed vehicle 10 to pass by others, and when the road is curved, it is necessary to turnover or turn back many times.

"Irregularity"

Figure 5A:
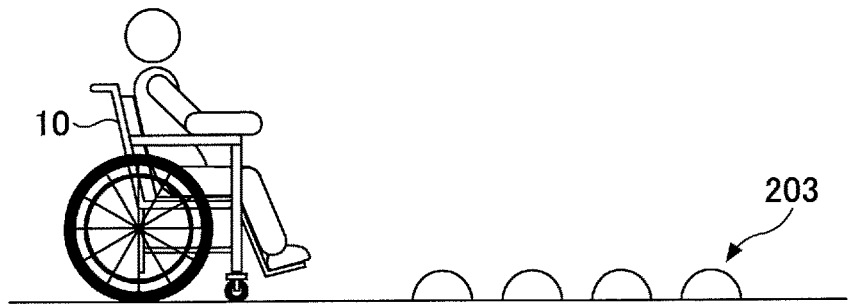
FIG. 5A to FIG. 5C are views for describing examples of types of obstacle factors determined at the server.
Figure 5B:
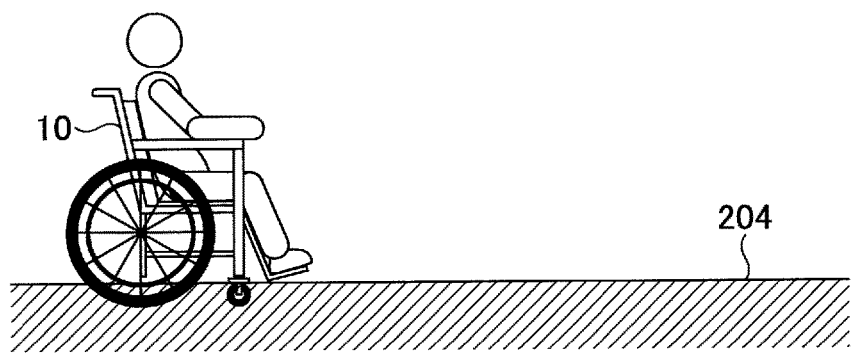
Figure 5C:
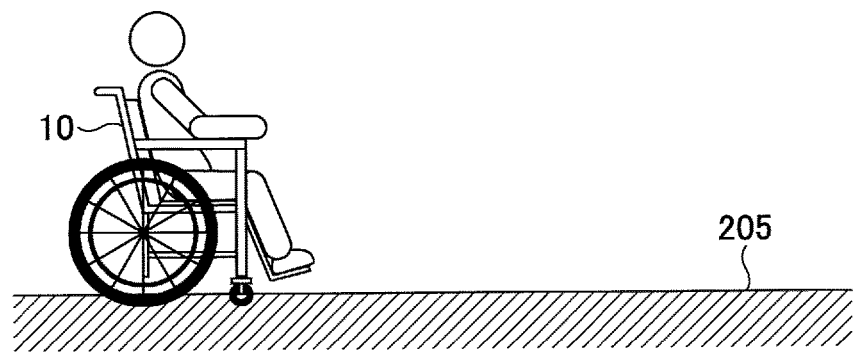

FIG. 5A to FIG. 5C illustrate obstacle factors called an "irregularity". The irregularity means a type of a road surface regarding an irregularity of the road surface. If a road surface is not flat or varied, it is difficult for the low-speed vehicle 10 to travel thereon.

FIG. 5A illustrates a braille block 203 as an example of the irregularity. It is hard for the low-speed vehicle 10 to travel on the braille block 203 because a small vibration is generated on the braille block 203.

FIG. 5B illustrates ballast 204 as an example of the irregularity. It is hard for the low-speed vehicle 10 to travel on the ballast 204 because tires of the low-speed vehicle 10 sunk in the ballast 204.

FIG. 5C illustrates soil 205 as an example of the irregularity. It is hard for the low-speed vehicle 10 to travel on soft soil, or on soil after rain or frost is generated because tires of the low-speed vehicle 10 sunk in the soil 205.

(Flow of Determining Existence of Obstacle Factor)

Figure 6A:
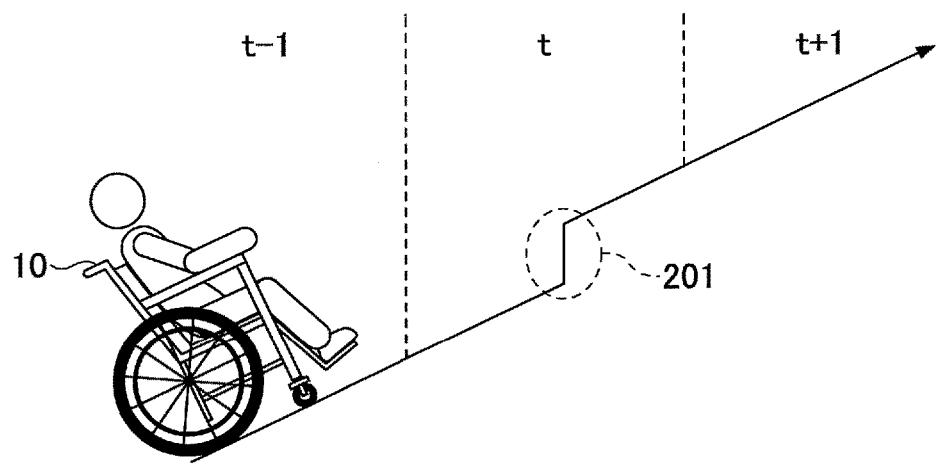
FIG. 6A to FIG. 6C are views for describing a flow of determining whether an obstacle factor exits.

A flow of determining an existence of the obstacle factor is described with reference to FIG. 6A to FIG. 6C. FIG. 6A schematically illustrates a landform where the low-speed vehicle 10 travels. As illustrated in FIG. 6A, the low-speed vehicle 10 is travelling a vertical inclination, and there is a step 201 in the middle. Each of "t−1", "t" and "t+1" in FIG. 6A illustrates a range of the predetermined period "T" during which the analysis engine 42 analyzes sensor data. In other words, a single analysis is conducted for the sensor data that is obtained over the predetermined period "T (t−1)", a single analysis is conducted for the sensor data that is obtained over the predetermined period "T (t)", and a single analysis is conducted for the sensor data that is obtained over the predetermined period "T (t+1)".

Figure 6B:
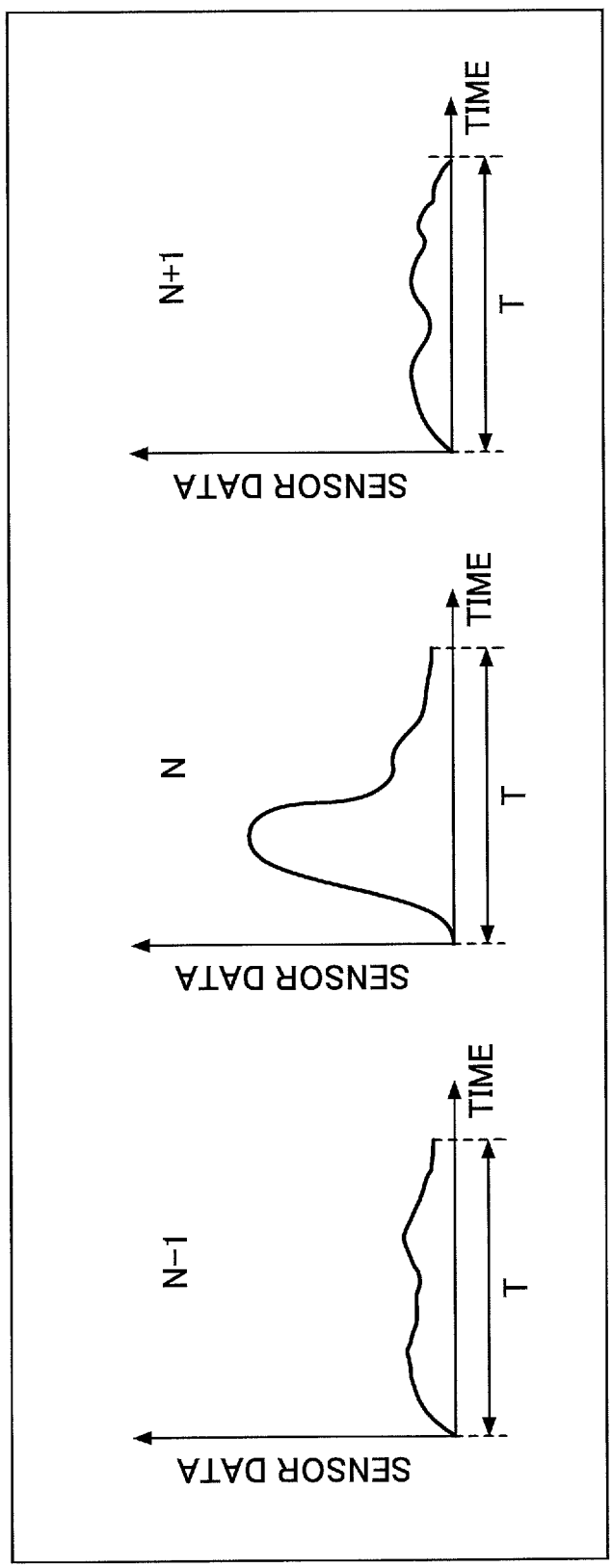

FIG. 6B schematically illustrates sensor data "N−1", "N" and "N+1" obtained at each predetermined period "T (t−1)", "T (t)" and "T (t+1)", respectively. The sensor data illustrated in FIG. 6B is, for example, acceleration. Each of the sensor data "N−1" and "N+1" is relatively flat, while the sensor data "N" varies largely. This means that acceleration varies largely in the sensor data "N", when the sensor data is acceleration. The analysis engine 42 determines whether an obstacle factor exists and individual attribute data of the obstacle factor by analyzing the sensor data "N" or the like.

Figure 6C:
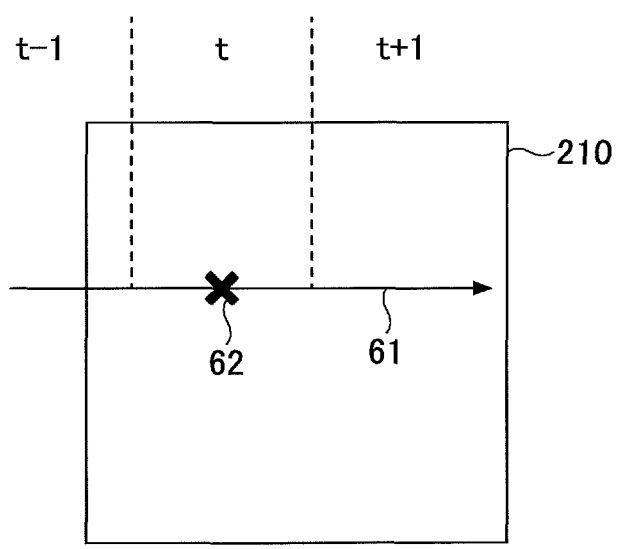

FIG. 6C is a view illustrating an example of a relationship between the mesh 210a and the obstacle factor. An arrow 61 in FIG. 6C indicates a trace of the low-speed vehicle 10, and each of "t−1", "t" and "t+1" indicates the predetermined period "T", similarly as FIG. 6A. When it is determined that an obstacle factor exists, a detected point 62 is stored in the analyzed result. Then, the analyzed result is associated with the mesh in which the detected point 62 is included.

(Analysis Engine)

Figure 7:
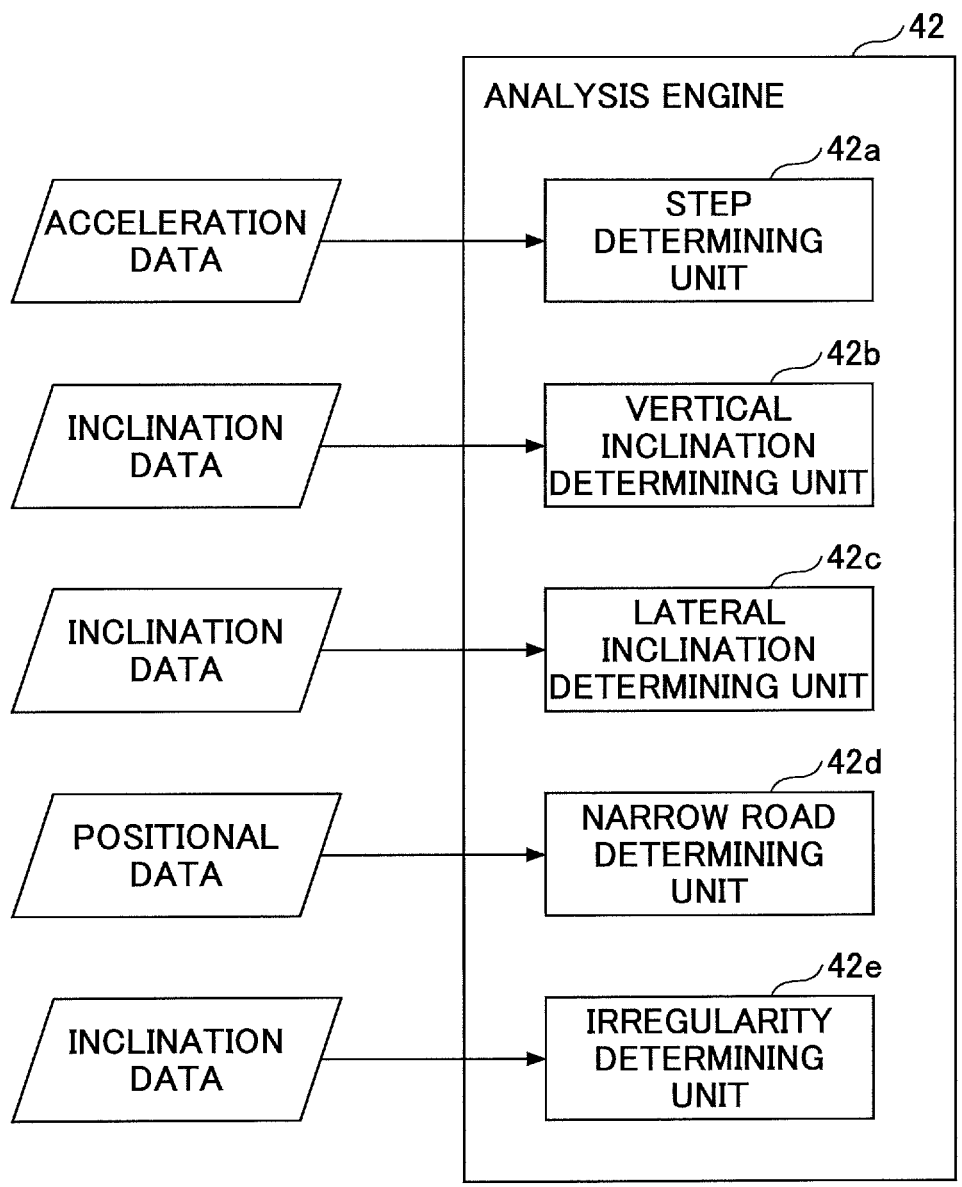
FIG. 7 is a functional block diagram illustrating an example of functions of an analysis engine by blocks.
Figure 8A:
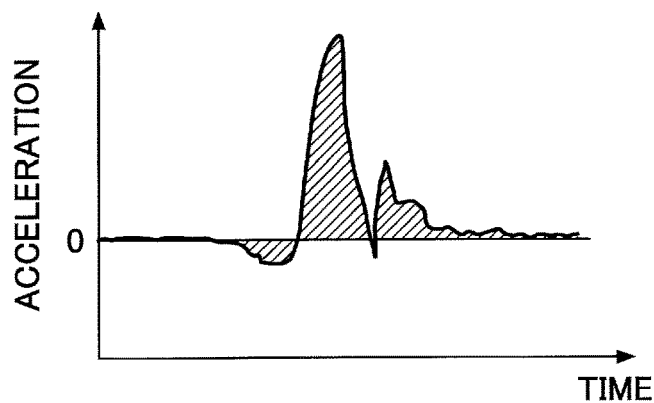
FIG. 8A to FIG. 8C are views for supplementary describing an example of a detection of an obstacle factor.
Figure 8B:
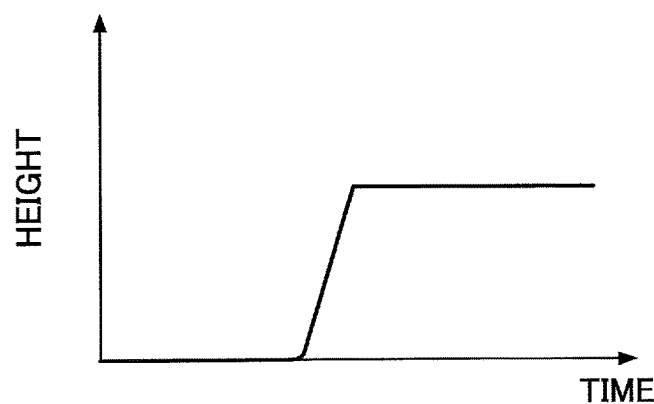
Figure 8C:
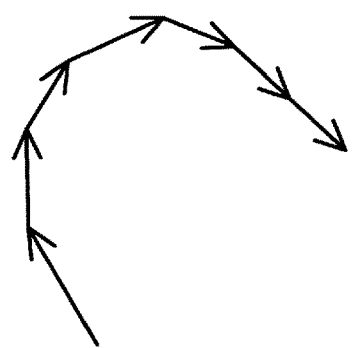

A method of determining an existence of an obstacle factor and individual attribute data of the obstacle factor by the analysis engine 42 is described in detail with reference to FIG. 7 to FIG. 8C. FIG. 7 is a functional block diagram illustrating an example of functions of the analysis engine 42 by blocks. The analysis engine 42 includes determining units corresponding to the obstacle factors, respectively. For example, the analysis engine 42 includes a step determining unit 42a, a vertical inclination determining unit 42b, a lateral inclination determining unit 42c, a narrow road determining unit 42d and an irregularity determining unit 42e. Further, although typical sensor data are associated with the respective determining units, respectively, in FIG. 7, these associations of the sensor data and the determining units are just an example for explanation.

The step determining unit 42a determines whether there is an obstacle factor "step" and a height of a step based on the acceleration data. FIG. 8A illustrates an example of acceleration data. As a difference in height (an existence of a step) influences acceleration in a vertical direction, acceleration in the vertical direction may be mainly used. As is well known, when the acceleration is integrated twice, a displacement is obtained. This displacement corresponds to a height. The step determining unit 42a performs a linear interpolation operation on the acceleration data of the predetermined period "T", obtains values of equal intervals to obtain data of equal intervals. Then, by integrating this data twice, the step determining unit 42a can calculate a height of the step as illustrated in FIG. 8B.

The step determining unit 42a compares an absolute value of the height with a threshold value, and determines that there is a step when the height is greater than or equal to the threshold value. Here, whether there is a step may be determined based on the acceleration data itself. In other words, the step determining unit 42a may compare an absolute value of the acceleration and a threshold value. Then, when the absolute value of the acceleration is greater than or equal to the threshold value, the step determining unit 42a can determine that there is a step as the obstacle factor.

The vertical inclination determining unit 42b mainly refers to a pitch angle of the inclination data, and calculates an average value, a maximum value or a minimum value of the predetermined period "T". When an absolute value of at least one of these values is greater than a threshold value, the vertical inclination determining unit 42b determines that there is a vertical inclination, as the obstacle factor. When it is determined that there is a vertical inclination, an average value of the predetermined period "T" is used as individual attribute data.

The lateral inclination determining unit 42c mainly refers to a roll angle of the inclination data, and calculates an average value, a maximum value or a minimum value of the predetermined period "T". When an absolute value of at least one of these values is greater than a threshold value, the lateral inclination determining unit 42c determines that there is a lateral inclination, as the obstacle factor. When it is determined that there is a lateral inclination, an average value of the predetermined period "T" is used as individual attribute data.

The narrow road determining unit 42d determines whether a narrow road exists based on a change of a position and a speed, for example. FIG. 8C illustrates an example of a change of a position of the low-speed vehicle 10 when passing through a narrow road. As the narrow road is a passage that is difficult for the low-speed vehicle 10 to travel, a speed is extremely lowered. Thus, it can be determined that a narrow road exists when a movement amount over the predetermined period "T" is less than a threshold value.

Preferably, a fact that the narrow road is curved may also be used. When a travelling direction is changed for a number of times greater than or equal to a threshold value over the predetermined period "T", it can be determined that a passage is curved. For example, the narrow road determining unit 42d may connect positional data over the predetermined period "T" by lines, calculate an angle between each of the lines between a first line to obtain angle differences, and then, compare the angle differences with a threshold value. Thus, the narrow road determining unit 42d determines that a narrow road exists as the obstacle factor when a speed is less than a threshold value and also a travelling direction is changed.

The irregularity determining unit 42e determines an irregularity of the road surface based on the acceleration data and the inclination data. For the case of the braille block, the acceleration changes little by little in a vertical direction, a lateral direction and a front and rear direction. Thus, the irregularity determining unit 42e detects plus and minus of the acceleration obtained in accordance with time, and determines that that an irregularity exists as the obstacle factor and the type of the road surface is the braille block when a number of reversed times of plus and minus exceeds a threshold value over the predetermined period "T". The irregularity determining unit 42e may determine that the braille block exists when the number of reversed times of plus and minus of the acceleration exceeds the threshold value in at least one of the vertical direction, the lateral direction and the front and rear direction. Alternatively, the irregularity determining unit 42e may perform Fourier transform on the acceleration data, and determine that the braille block exists when a high frequency component is significantly larger with respect to a low frequency component.

For the case of the ballast, although a variation of the acceleration is not as large as that of the braille block, as tires sunk, the low-speed vehicle 10 sways. For example, as the tires may sink differently between left and right, or front and rear, a variation of a lateral inclination and a vertical inclination occur. For example, the irregularity determining unit 42e calculates variance of inclination in a lateral direction and a front and rear direction over the predetermined period "T", compares the calculated result with a threshold value and determines that the irregularity exists as the obstacle factor and the type of the road surface is the "ballast" when the variance that is greater than or equal to the threshold value is detected.

For the case of the soil, there is a tendency similar to that of the ballast, an existence of the soil can be determined similarly as the ballast. However, the tires sink less by the soil compared with the case of the ballast, a threshold value is prepared for the soil, and the irregularity determining unit 42e compares a variance obtained from the inclination with the threshold value is prepared for the soil.

The irregularity determining unit 42e determines that the type of the road surface is a flat when the road surface is determined as none of the braille block, the ballast and the soil.

(Aggregation Based on Analyzed Result)

As described above, when the analysis engine 42 determines that an obstacle factor exists in the sensor data over the predetermined period "T", an analyzed result of the detected point is obtained.

Figure 9:
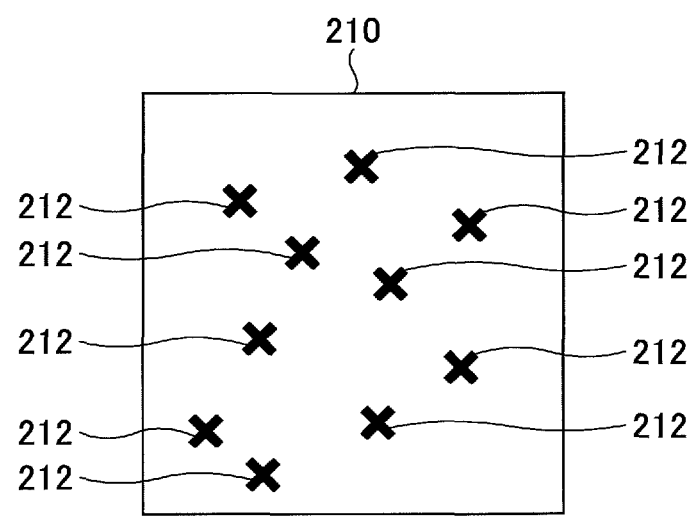
FIG. 9 is a view schematically illustrating analyzed results detected in a mesh.

FIG. 9 schematically illustrates analyzed results detected in a mesh. In FIG. 9, ten analyzed results 212 are obtained in one mesh. The aggregating unit 43 aggregates the analyzed results for each of the meshes.

Table 3 is a view for describing an example of a method of aggregating each of the obstacle factors. As illustrated in Table 3, the aggregating unit 43 calculates an average value of individual attribute data for each of the obstacle factors as an aggregated value. For example, when there are ten analyzed results, the analyzed results are extracted for each of the obstacle factors from the ten analyzed results, and an average value is calculated.

TABLE 3

| | CALCULATED ITEM | | CALCULATING METHOD |
|---|---|---|---|
| OBSTACLE FACTOR | STEP | AVERAGE VALUE OF HEIGHTS | (a) |
| | | AZIMUTH | (b) |
| | VERTICAL INCLINATION | AVERAGE INCLINATION | (c) |
| | | AZIMUTH | (d) |
| | LATERAL INCLINATION | AVERAGE INCLINATION | (e) |
| | | AZIMUTH | (f) |
| | NARROW ROAD | AZIMUTH | (g) |
| | IRREGULARITY | COUNT FOR EACH TYPE OF ROAD SURFACE | (h) |
| | | AZIMUTH | (i) |

In table 3, calculation methods are as follows.

Step: (a) means to calculate an average value of heights of analyzed results (individual attribute data) in which steps are detected. (b) means to calculate an average value of azimuths of analyzed results in which steps are detected.

Vertical inclination: (c) means to calculate an average value of vertical inclinations of analyzed results (individual attribute data) in which vertical inclinations are detected. (d) means to calculate an average value of vertical azimuths of analyzed results in which vertical inclinations are detected.

Lateral inclination: (e) means to calculate an average value of lateral inclinations of analyzed results (individual attribute data) in which lateral inclinations are detected. (f) means to calculate an average value of lateral azimuths of analyzed results in which lateral inclinations are detected.

Narrow road: (g) means to calculate an average value of azimuths of analyzed results in which narrow roads are detected. As there are no individual attribute data for the "narrow road", an average value is not calculated. Instead, an aggregated value is set to be "0.5". As will be described later, as an aggregated value (average value) of each of the "step", the "vertical inclination" and the "lateral inclination" is normalized to be a value less than or equal to 1 (and greater than or equal to 0), an intermediate value of a range from 0 to 1 is used. When it is desired to make a contribution ratio of the narrow road to a score to be large, the aggregated value is set to be a value that is close to "1", and when it is desired to make the contribution ratio of the narrow road to the score to be small, the aggregated value is set to be a value that is close to "0".

Irregularity: A number of detected times for each type of the road surface (braille block, ballast, soil, flat) is used as an aggregated value. (h) is a number of detected times for each type of the road surface. (i) means to calculate an average value of azimuths for each type of the road surface.

For example, when ten analyzed results are associated with one of the meshes, and the obstacle factor "step" is detected for three of the ten analyzed results, heights "h1" to "h3" of the steps are obtained from the three individual attribute data of the obstacle factor, and an average value of the heights is (h1+h2+h3)/3. An average value of each of the vertical inclination and the lateral inclination is similarly calculated. For the narrow road, regardless of a fact whether the obstacle factor "narrow road" exists in the ten analyzed results, an aggregated value is 0.5. For the irregularity, the number of analyzed results, among the ten analyzed results, in each of which the braille block is counted, the number of analyzed results, among the ten analyzed results, in each of which the ballast is counted, the number of analyzed results, among the ten analyzed results, in each of which the soil is counted, and the number of analyzed results, among the ten analyzed results, in each of which the flat is counted are detected.

Further, for the "azimuth", an average value of the azimuths is simply calculated for each of the obstacle factors.

The aggregating unit 43 sets the average value of each of the "step", the "vertical inclination" and the "lateral inclination" as the individual attribute data of the obstacle data. Further, for the irregularity, the aggregating unit 43 sets the type of the road surface which is detected once or more as the individual attribute data of the obstacle data. Further, the aggregating unit 43 sets an average value of azimuths for each of the obstacle factors as the obstacle data.

(Calculation of Score)

The aggregated value is obtained for each of the obstacle factors as described above. However, the aggregated values are different in a unit and a range of a numerical value. Thus, it is difficult to synthesize the obstacle factors by simply adding them. Thus, the aggregating unit 43 normalizes each of the aggregated values.

Step ($S_{step}$): A value obtained by dividing an aggregated value (an average value of the heights) by a maximum value of the height is used.

Vertical inclination ($S_{slope1}$): A value obtained by dividing an aggregated value (an average value of the vertical inclinations) by a maximum value of the vertical inclination is used.

Lateral inclination ($S_{slopex}$): A value obtained by dividing an aggregated value (an average value of the lateral inclination) by a maximum value of the lateral inclination is used.

Narrow road ($S_{narrow}$): As described above, "0.5" is used as a normalized value.

Irregularity ($S_{irre}$): A value obtained by dividing the number of detected times of the type of the road surface (braille block, ballast, soil or flat) that is detected most by the number of detected times of all of the types of the road surfaces is used.

With the above calculations, the aggregated value for each of the obstacle factors can be set within a range between 0 to 1. The aggregating unit 43 calculates a score that indicates a synthesized difficulty in travelling in the respective mesh by adding the aggregated values while weighting based on the number of detected times of each of the obstacle factors.

Each term is defined as follows.

$N_{step}$: The number of detected times of the obstacle factor "step" in the mesh.

$N_{slope1}$: The number of detected times that the obstacle factor "vertical inclination" in the mesh.

$N_{slopex}$: The number of detected times of the obstacle factor "lateral inclination" in the mesh.

$N_{narrow}$: The number of detected times of the obstacle factor "narrow road" in the mesh.

$N_{irre}$: The number of detected times of the type of road surface that is detected most in the mesh.

Further, "$N_{all}$" is defined as follows.

$$N_{all}=N_{step}+N_{slope1}+N_{slopex}+N_{narrow}+N_{irre}$$

The score is calculated by a following formula.

[Formula 1]

$$S_{all} = \frac{1}{N_{all}}(N_{step} \times S_{step} + N_{narrow} \times S_{narrow} + N_{slopex} \times S_{slopexp} + N_{slope1} \times S_{slope1} + N_{irr} \times S_{irr}) \quad (1)$$

As is apparent from the formula (1), the score becomes larger as the number of detected times becomes larger. Further, the score becomes larger as the aggregated value becomes larger. Thus, a synthesized difficulty in travelling in the mesh can be expressed by a numerical value. Here, as the score is divided by "$N_{all}$", the score has a value from 0 to 1. In this embodiment, in order to simplify the score, a calculated result of the formula (1) is multiplied by 100. With this, the score has a value from 0 to 100.

Further, the contribution ratio of each of the obstacle factors is calculated as follows.

[Formula 2]

$$\text{CONTRIBUTION RATIO} = \frac{N \times S}{\left( \begin{array}{c} N_{step} \times S_{step} + N_{narrow} \times S_{narrow} + \\ N_{slopex} \times S_{slopexp} + N_{slope1} \times S_{slope1} + N_{irr} \times S_{irr} \end{array} \right)} \quad (2)$$

Here, a numerator of the formula (2) "N×S" expresses a product of the number of detected times and the aggregated value of a selected one of the obstacle factors. The aggregating unit 43 sets the contribution ratio of each of the obstacle factors in the obstacle data.

(Example of Displaying Obstacle Data)

The obstacle data as illustrated in Table 2 is calculated by the above described steps. As the obstacle data is aggregated for each mesh unit, the obstacle data is displayed as follows on the electronic map.

Figure 10A:
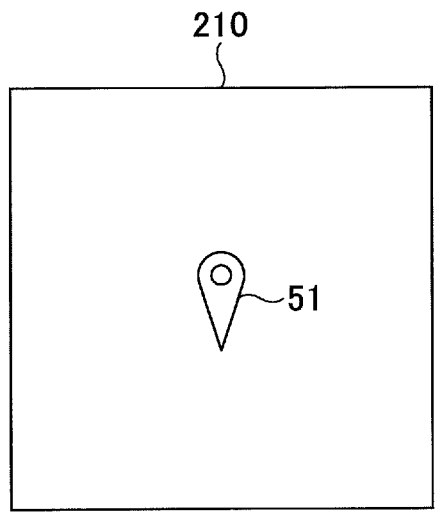
FIG. 10A and FIG. 10B are views schematically illustrating obstacle data associated with the mesh.
Figure 10B:
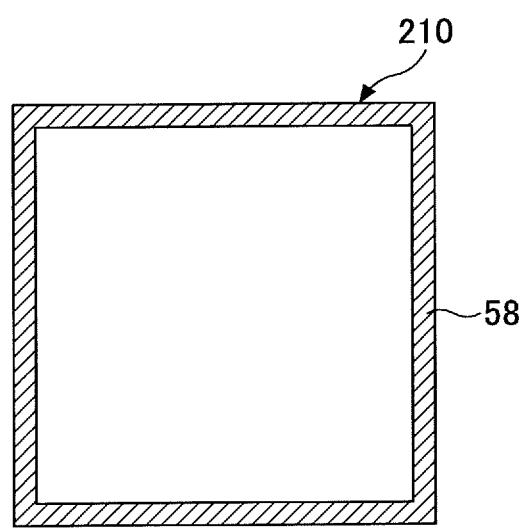

FIG. 10A and FIG. 103 are views schematically illustrating obstacle data associated with a mesh. In FIG. 10A, the obstacle data is displayed by a pin icon 51. In FIG. 10B, the obstacle data is displayed by a frame 58. The obstacle data of Table 2 may be associated with at a center of the mesh. Further, the terminal device 20 may display a fact that the obstacle data exists on the electronic map only when the score is greater than or equal to a threshold value. This is because a necessity is small to display obstacle data whose score is small. However, it is preferable that a user can set a threshold value because there is an individual difference in the score by which the user may feel that it is difficult to travel.

Further, as illustrated in FIG. 10A, when the fact that the obstacle data exists is displayed by the pin icon 51, a color of the pin icon 51 may be changed in accordance with the size of the score. For example, when the score is large, the pin icon 51 may be displayed by a noticeable color. Alternatively, the size of the score may be displayed by other configurations such as the size, the shape of the pin icon 51, other symbols (such as, for example, "L" (large), "M" (middle) and "S" (small), or a speed of flashing.

Further, as illustrated in FIG. 10B, the terminal device 20 may display the frame 58 on the electronic map instead of the pin icon 51. At this time, when the score is greater than or equal to a threshold value, the frame 58 surrounding the mesh 210 may be illustrated by more noticeable color as the score increases.

Figure 11:
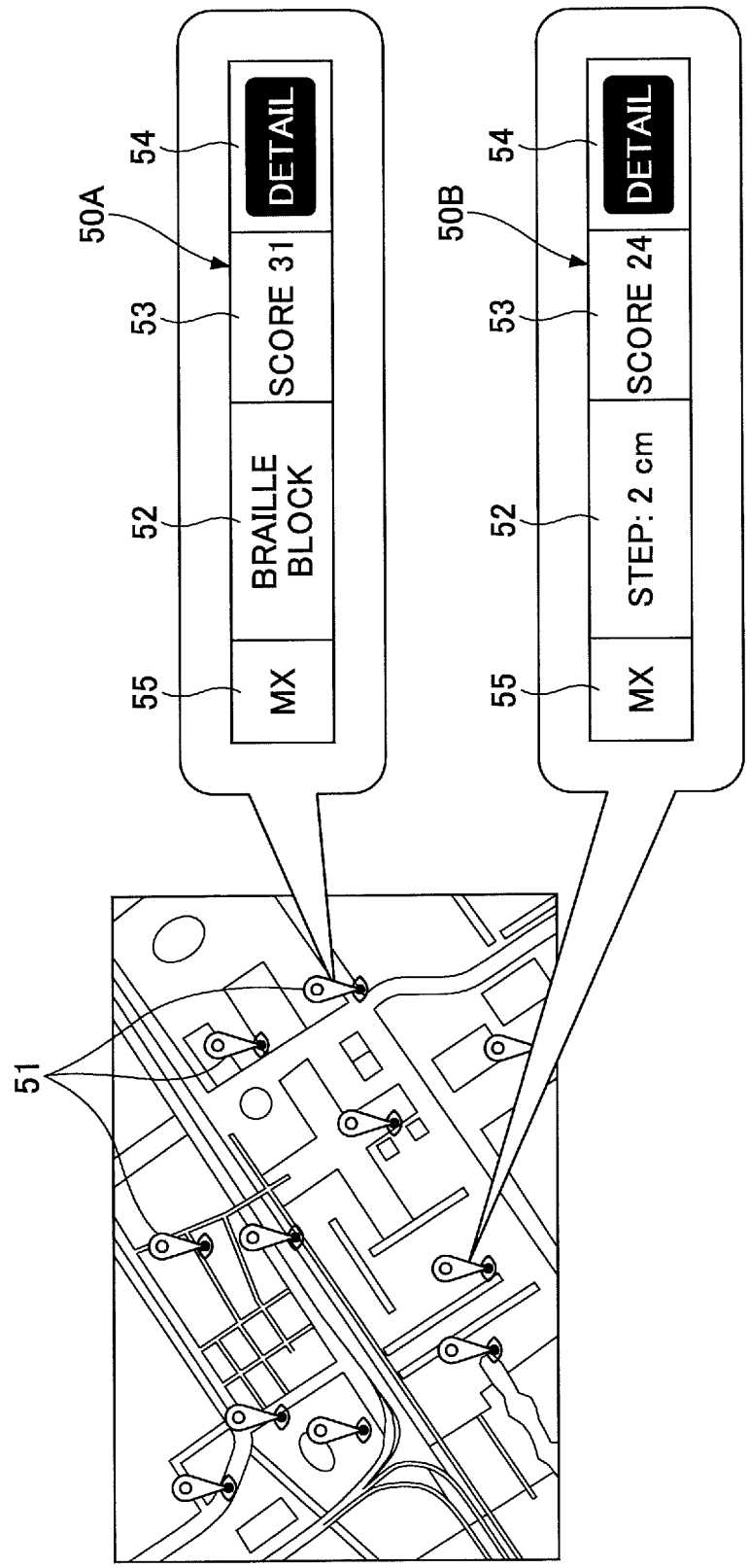
FIG. 11 is a view illustrating a display example of an electronic map and obstacle data on a display of the terminal device.

FIG. 11 illustrates an example of the electronic map and the obstacle data displayed on the display 26 of the terminal device 20. In this example, the electronic map is equally sectioned into meshes, and the pin icon 51 is only displayed in a mesh in which an obstacle factor is detected, or in a mesh whose score is greater than or equal to a threshold value. Further, a color of each of the pin icons 51 is different based on the size of the score. When a user presses one of the pin icons 51, the operation accepting unit 25 specifies the pressed pin icon 51, and the screen display unit 24 displays a detail 50 of the obstacle data associated with the pin icon 51. In FIG. 11, codes 50A and 50B are attached to of the details of the obstacle data for explanation.

In FIG. 11, multiple-data 55, a maximum obstacle factor 52, a score 53 and a detail button 54 are displayed as the detail of the obstacle data. For the multiple-data 55, when a plurality of obstacle factors are detected in the mesh, "MX" is displayed, while only a single obstacle factor is detected in the mesh, "SGL" is displayed. Thus, a user can grasp whether there is a plurality of obstacle factors by a glance.

The maximum obstacle factor 52 is the obstacle factor whose contribution ratio is the maximum in the mesh. It is preferable to display the type of the road surface when the irregularity is the maximum obstacle factor, as illustrated in the detail of the obstacle data 50A. With this, the user can confirm the obstacle factor that may influence on the difficulty in travelling most, among the multiple obstacle factors. This type of the road surface is the type of the road surface that is detected most among the plurality of types of the road surfaces associated with the irregularity of the individual attribute data. Further, when the step, the vertical inclination or the lateral inclination has the maximum contribution ratio, it is preferable that the individual attribute data (height, vertical inclination, lateral inclination) is also displayed, as illustrated the detail of the obstacle data 50B. With this, the user can confirm the obstacle factor that may influence on the difficulty in travelling most, among the multiple obstacle factors, and further, can know the actual step, vertical inclination, or lateral inclination.

The score 53 is a value set in the obstacle data and calculated by the above described formula (2). When the detail button 54 is pressed, the screen display unit 24 causes the display 26 to display a place name obtained from a center coordinate, the azimuth set in the obstacle data, the contribution ratio of each of the obstacle factors and the like.

(Operation Steps)

Figure 12:
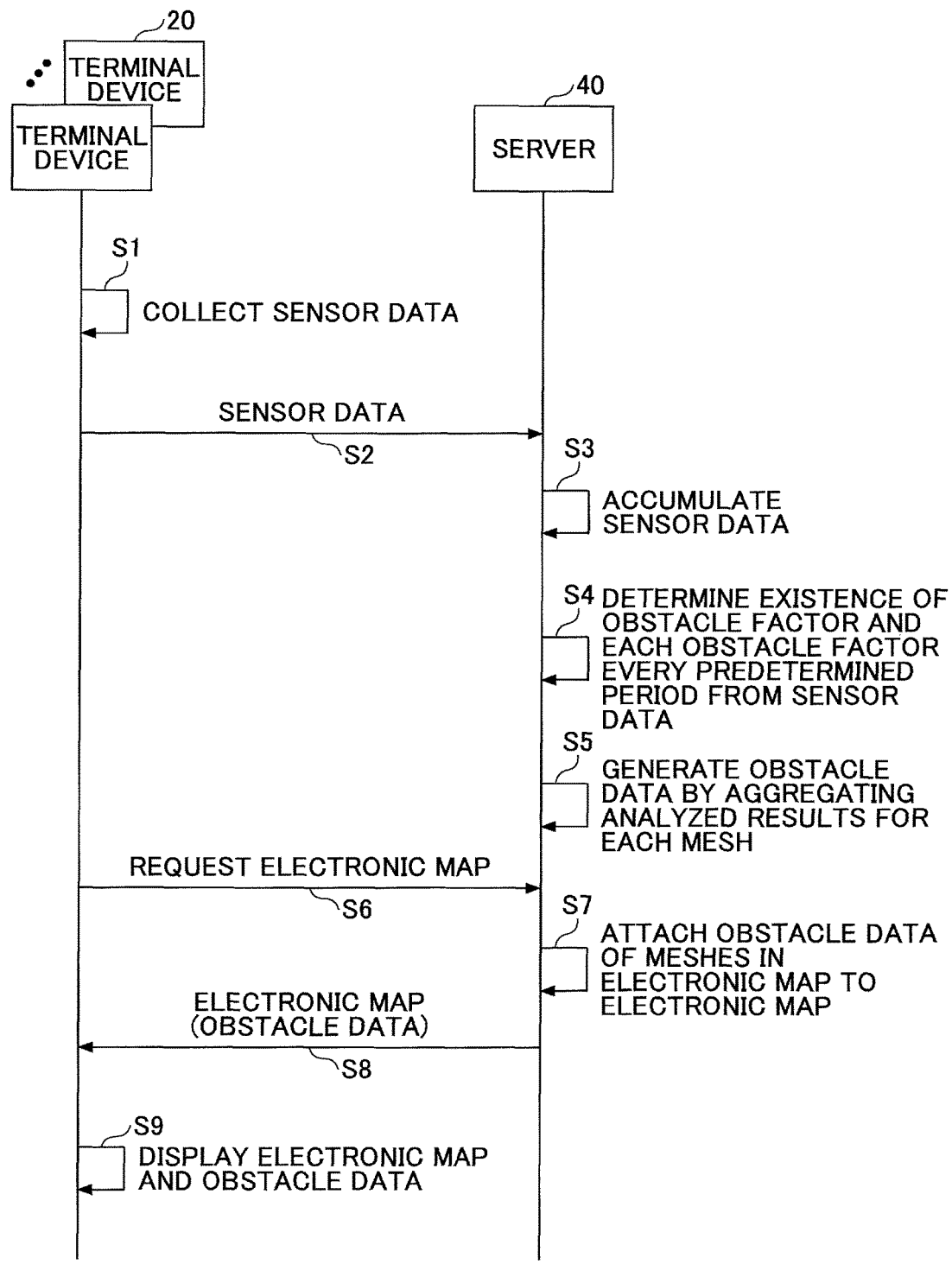
FIG. 12 is a sequence diagram illustrating an example of a flow of the entire operation of the obstacle data providing system.

FIG. 12 is a sequence diagram illustrating an example of a total operation of the obstacle data providing system 100 of the embodiment.

Step S1: The sensor unit 21 of the terminal device 20 detects positional data, acceleration data and inclination data. The sensor data sending unit 22 collects the sensor data until timing to send the sensor data.

Step S2: At the timing to send the sensor data, the sensor data sending unit 22 sends the sensor data to the server 40.

Step S3: The sensor data receiving unit 41 of the server 40 receives the sensor data, and accumulates them in the analysis engine 42.

Step S4: The analysis engine 42 sequentially analyzes the sensor data for each predetermined period "T". The analysis engine 42 determines an existence of an obstacle factor from the sensor data every predetermined period "T", and when the obstacle factor exists, calculates individual attribute data of each of the obstacle factors. The analyzed results are stored in the analyzed result DB 491.

Step S5: The aggregating unit 43 reads out analyzed results from the analyzed result DB 491, and aggregates the analyzed results for each of the meshes to generate obstacle data. As the obstacle factors do not change during a short period, the aggregation of the analyzed results may be performed when a certain amount of analyzed results is accumulated for each of the meshes.

Step S6: The electronic map obtaining unit 23 of the terminal device 20 requests the server 40 for the electronic map at desired timing. The request for the electronic map may include positional data of the terminal device 20.

Step S7: The map generation unit 44 of the server 40 generates electronic map around the positional data, and attaches the obstacle data each associated with the respective mesh in a range of this electronic map to the electronic map.

Step S8: The map generation unit 44 sends the obstacle data to the terminal device 20 with the electronic map.

Step S9: The electronic map obtaining unit 23 of the terminal device 20 receives the electronic map, and sends it to the screen display unit 24. The screen display unit 24 displays the obstacle data expressed by the pin icon 51 or the like with the electronic map on the display 26.

(Summary)

As described above, according to the obstacle data providing system 100 of the embodiment, as the obstacle data is generated by synthesizing multiple obstacle factors, it is easy for a user of the low-speed vehicle 10 to determine how difficult it is to travel on a landform including multiple obstacle factors.

Example 2

In this example, the obstacle data providing system 100 is described in which a mesh size of meshes in each of which the analyzed results are aggregated (synthesized) is changed in accordance with a size of the low-speed vehicle 10.

It is described in example 1 that the "mesh" is a four-square rectangular shape area, where a length of one side is set as an appropriate length for aggregation of the obstacle data. Further, the server 40 provides data to the user after aggregating the analyzed results to the mesh (or to a range having a certain area such as rectangular or polygon).

However, as various sizes of the low-speed vehicles 10 exist as a category of a low-speed vehicle, there may be some inconveniences if a unit for aggregation (in other words, a mesh size) is fixed or constant. This will be described with reference to FIG. 13.

Figure 13:
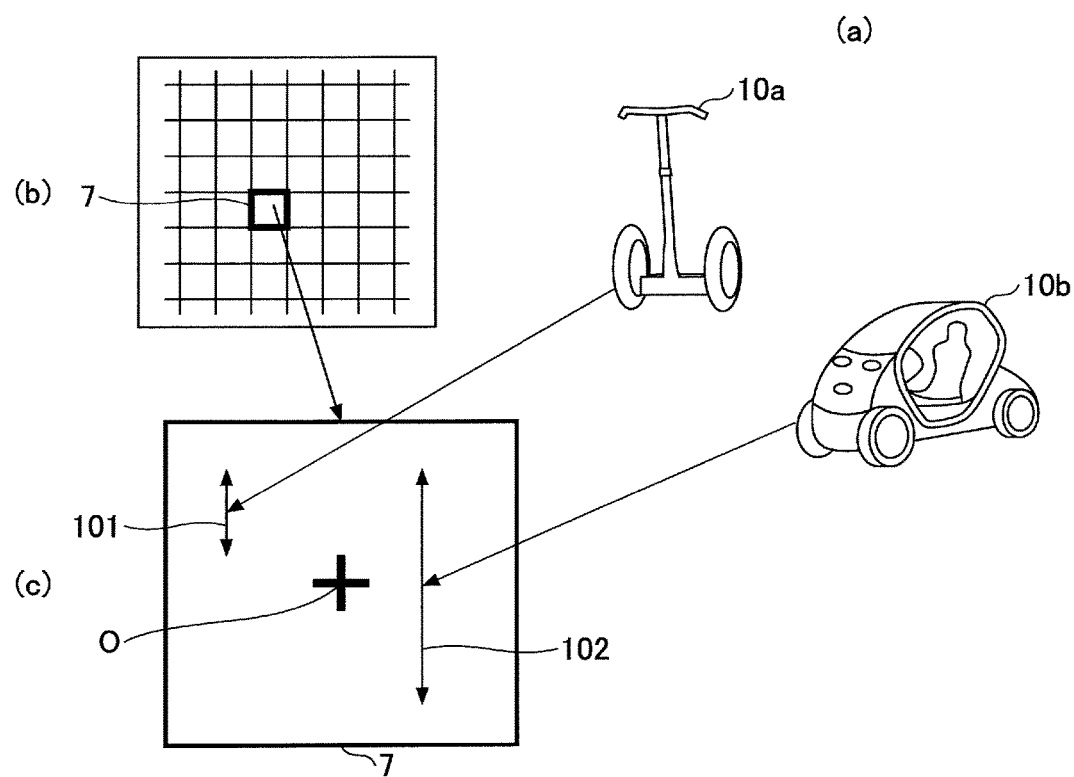
FIG. 13 is a view for describing an example of a problem that may occur when a mesh size is fixed or constant although there are various low-speed vehicles of different sizes.

FIG. 13 is a view for describing an example of a problem that may occur when the mesh size is fixed or constant although there are various low-speed vehicles of different sizes. In FIG. 13, (a) illustrates an appearance of a low-speed vehicle 10a and a low-speed vehicle 10b in actual. The low-speed vehicle 10a can travel on a walkway but the low-speed vehicle 10b is prescribed by law to travel on a carriage way. The low-speed vehicle 10a is driven by a user while the user is standing on the low-speed vehicle 10a and includes only two wheels at both lateral sides that are parallel with each other. Thus, the total length of the low-speed vehicle 10a is a few 10 cm. Meanwhile, the low-speed vehicle 10b is driven by a user while sitting with extending his/her legs in front and includes four wheels at front and back sides. The total length of the low-speed vehicle 10b is 1 to 2 meters.

In FIG. 13, (b) illustrates a plurality of meshes 7, and (c) is a view illustrating one of the meshes 7 in (b) in an enlarged manner. The analyzed results included in the mesh 7 are aggregated as obstacle data of the mesh 7. In (c) of FIG. 13, an arrow 101 indicates a relative size of the low-speed vehicle 10a with respect to a mesh size of the mesh 7, and an arrow 102 indicates a relative size of the low-speed vehicle 10b with respect to the mesh size of the mesh 7.

First, a case of the low-speed vehicle 10a is described in which the size of the low-speed vehicle 10a is smaller with respect to the mesh size of the mesh 7 of (c) of FIG. 13. As a center "0" becomes a position of the mesh 7, the obstacle data is displayed at the center "0" of the mesh 7. However, when the size of the low-speed vehicle 10a is smaller with respect to the mesh size of the mesh 7, a position where an actual obstacle factor exists and a position of the obstacle data on the map are departed from each other, and reliability of the obstacle data is lowered. In other words, there is a risk that a user may have disagreeable feeling because although an obstacle factor that seems to be near the user on the map may be actually far from the position of the low-speed vehicle 10a of the user. Further, in this case, too many different obstacle factors are tend to be aggregated to the one mesh 7, and the obstacle data provided to the user may be complicated.

On the other hand, as a case of the low-speed vehicle 10b in which the size of the low-speed vehicle 10b is larger with respect to the mesh size of the mesh 7 as illustrated in (c) of FIG. 13, the number of the obstacle factors (analyzed results) occurred in each of the meshes 7 becomes small, and there is a risk that reliability of the obstacle data is lowered. For example, when expressing a size of a step by a numerical value, a height or the like may be inaccurate when only one step exists. However, if a plurality of analyzed results regarding steps for the mesh 7 are obtained, by calculating its average value, more accurate obstacle data regarding the steps can be generated.

Thus, according to the obstacle data providing system 100 of the example, a mesh size of meshes in each of which analyzed results are aggregated and single obstacle data is generated is appropriately determined in accordance with a size of the low-speed vehicle 10.

(Schematic Operation of Obstacle Data Providing System)

Figure 14:
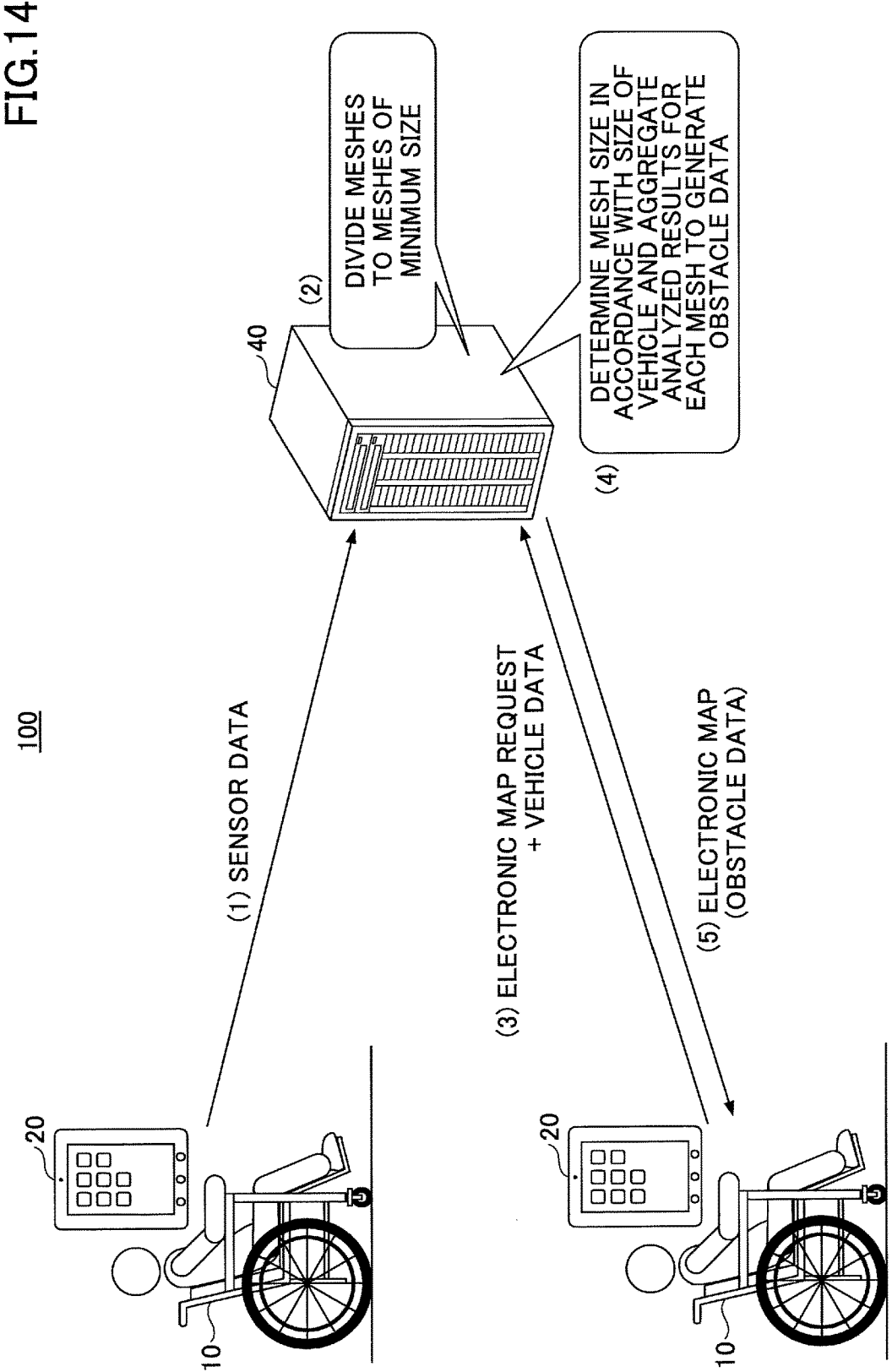
FIG. 14 is a view for describing an example of a schematic operation of the obstacle data providing system of example 2.

FIG. 14 is a view for describing an example of a schematic operation of the obstacle data providing system 100.
(1) As described in example 1, the low-speed vehicle 10 sends sensor data to the server 40.
(2) Similar to example 1, when collecting the sensor data, the server 40 registers analyzed results of the sensor data in the analyzed result DB 491.

Meanwhile, the server 40 divides the meshes of map data stored in the map DB 493 or the like to meshes of a minimum size. The mesh of the minimum size means a mesh size which is slightly larger than a size of a low-speed vehicle that can be considered as a minimum size among various low-speed vehicles travelling at home and abroad. This minimum mesh size is determined by considering original meshes of a map provided as the map data as well. By preparing map data divided by the meshes of such a minimum size, map data for the relatively large low-speed vehicle 10 can also be prepared in which the mesh size becomes a multiple of the meshes of the minimum size. Thus, map data divided by meshes of a mesh size that is slightly larger than the size of the low-speed vehicle 10 can be prepared for all types of the low-speed vehicles 10.

(3) When the low-speed vehicle 10 requests an electronic map corresponding to a travelling position to the server 40, the low-speed vehicle 10 also sends vehicle data of the respective low-speed vehicle 10 to the server 40 in this example. The vehicle data includes data by which the size of the vehicle 10 (vehicle body) such as a total length, for example, can be recognized.
(4) When the server 40 obtains the request of the electronic map, the server 40 determines a mesh size appropriate for the size of the low-speed vehicle 10. Then, the server 40 aggregates the analyzed results for each of the meshes of such a mesh size, and generates obstacle data for each of the meshes of the map data.
(5) The server 40 sends the obstacle data of each of the meshes, whose size is appropriately changed, with the electronic map to the low-speed vehicle 10.

(Functions)

Figure 15:
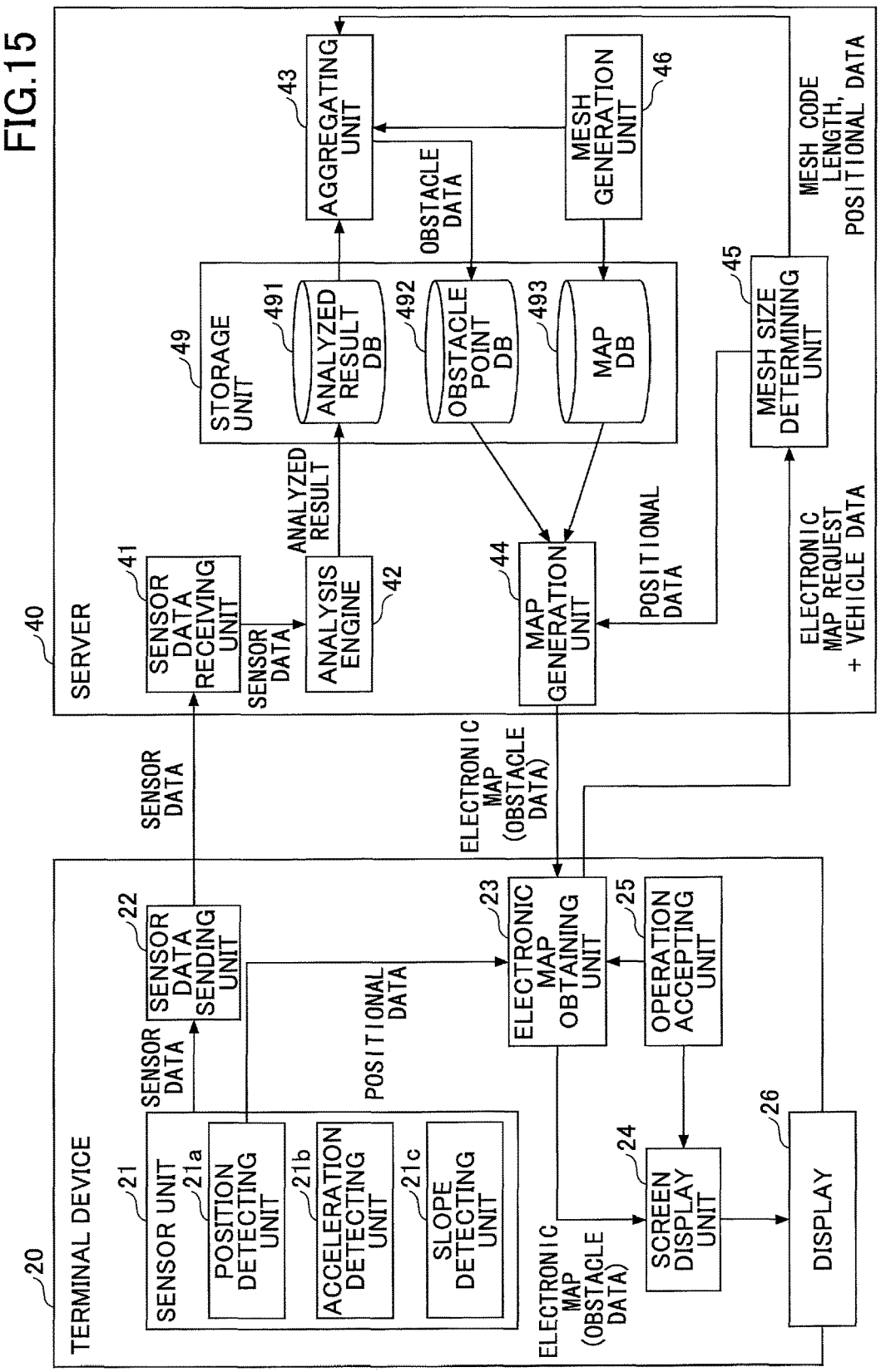
FIG. 15 is a functional block diagram illustrating an example of functions of a terminal device and a server by blocks of example 2.

FIG. 15 is a functional block diagram illustrating an example of functions of the terminal device 20 and the server 40. In this example, it is to be noted that components same as those illustrated in FIG. 3 are given the same reference numerals, and explanations may not be repeated.

The server 40 of the example further includes a mesh generation unit 46 and a mesh size determining unit 45. The mesh generation unit 46 generates meshes of a minimum size determined based on the size of the low-speed vehicle 10 that can be considered as the minimum size among various low-speed vehicles travelling at home and abroad, as described above. When generating the meshes of the minimum size, the mesh generation unit 46 generates a mesh code for identifying each of the meshes, and associates the mesh codes to coordinates of the map data, respectively.

Upon obtaining the electronic map request and the vehicle data from the terminal device 20, the mesh size determining unit 45 determines a mesh size appropriate for the respective low-speed vehicle 10. Then, the mesh size determining unit 45 sends a minimum mesh code length for specifying the meshes of this mesh size and the positional data of the low-speed vehicle 10 to the aggregating unit 43.

Thus, the aggregating unit 43 of the example aggregates the analyzed results and generates obstacle data after the mesh size to be used is determined. The aggregating unit 43 converts the positional data to mesh codes by the mesh code length determined by the mesh size determining unit 45. Although details will be described later, when the mesh code length is three digits, the aggregating unit 43 converts the positional data to the mesh codes of three digits. The aggregating unit 43 obtains the analyzed results of the obstacle factors included in the mesh specified by the mesh code from the analyzed result DB 491, and generates the obstacle data for each of the meshes. Then, the aggregating unit 43 registers the obstacle data in the obstacle point DB 492 in association with the mesh code.

Then, the map generation unit 44 reads out the map data from the map DB 493 in accordance with the positional data included in the electronic map request, generates the electronic map, reads out the obstacle data of the mesh codes (the number of digits may be changed in accordance with the size of the low-speed vehicle 10) specified by the positional data from the obstacle point DB 492 and attaches them to the electronic map.

(Mesh of Minimum Size)

Figure 16:
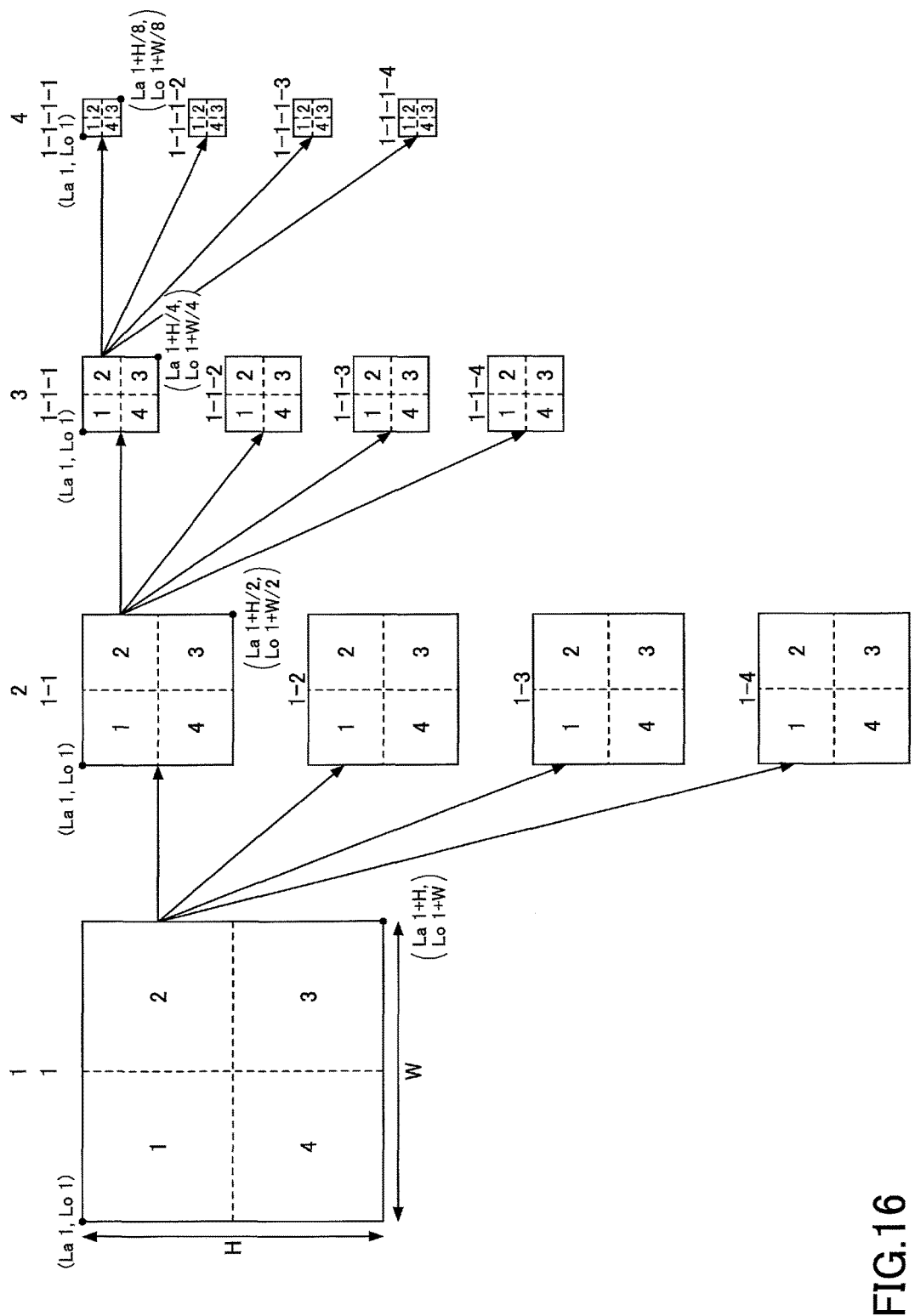
FIG. 16 is a view for describing an example of a method of generating a mesh of a minimum size by dividing a mesh.

A method of generating meshes of a minimum size is described with reference to FIG. 16. FIG. 16 is a view for describing an example of the method of generating the meshes of a minimum size by dividing meshes. As map data is provided by being divided into rectangular meshes generally, the map data of the map DB 493 is previously divided into meshes of a certain size as well. For example, it is assumed that the map data illustrated at leftmost in FIG. 16 that is divided by meshes of a certain size is available. This is referred to as meshes of a layer 1 here.

Such map data can be furthermore divided (theoretically infinitely), and each of the meshes of the layer 1 can be equally divided (¼, for example). The meshes after being divided once are referred to as meshes of a layer 2 here. Similarly, meshes after being divided twice are referred to as meshes of a layer 3, and meshes after being divided three times are referred to as meshes of a layer 4. This will be repeated. By dividing each of the meshes once, the number of layer is increased by one, and a size of each side of a mesh becomes ½.

In this example, it is preferable that the mesh size for the target low-speed vehicle 10 is determined such that the size of the target low-speed vehicle 10 is smaller than the mesh, and also a distance between an actual position of each of the obstacle factors and a center of the mesh is not so large. Thus, a minimum size of the meshes (hereinafter, referred to as a "minimum mesh size" as well) may be set as approximately twice of a total length of the low-speed vehicle 10 that can be considered as the minimum among low-speed vehicles 10 travelling at home and abroad. For example, when the total length of the minimum low-speed vehicle 10 is 30 cm, the minimum mesh size (a length of one side of the meshes) is 60 cm.

Meanwhile, if the mesh size of the layer 1 is not a multiple of 60 cm, meshes each of whose length of one side is 60 cm cannot be obtained by just repeatedly dividing the meshes of the layer 1. Thus, the mesh generation unit 46 determines the minimum mesh size based on the mesh size of the original meshes of the map data as well, in addition to the size of the minimum low-speed vehicle 10.

For example, when dividing the original meshes "n+1" th times and the length of one side of each of the meshes becomes smaller than a size approximately twice of the total length of the minimum low-speed vehicle 10, the mesh generation unit 46 determines the meshes obtained by dividing the original meshes "n" th times as the meshes of the minimum size. More specifically, in a case where the total length of the minimum low-speed vehicle 10 is 30 cm as described above, when the length of one side becomes 50 cm by dividing the original meshes five times, the mesh generation unit 46 may determine 100 cm, which is the mesh size obtained by dividing four times, as the minimum mesh size. Here, the minimum mesh size may be determined such that a difference between the length of one side of the mesh and the twice of the total length of the minimum low-speed vehicle 10 is within a predetermined range, and the minimum mesh size may be smaller than the twice of the total length of the minimum low-speed vehicle 10.

For example, as illustrated in FIG. 16, it is assumed that the meshes of the minimum size can be obtained by dividing the original meshes of the layer three times (the layer 4). Thus, the mesh generation unit 46 generates the meshes of the layer 2, the meshes of the layer 3 and the meshes of the layer 4.

Here, the mesh code for specifying each of the divided meshes is given by a predetermined method. As an example, when a mesh of the layer 1 is divided by four, mesh codes for meshes of a lower layer (the layer 2) may be generated just by giving numbers 1, 2, 3 and 4 to the divided meshes from an upper left mesh in a clockwise direction, respectively. Mesh codes for a part of meshes illustrated in FIG. 16 are described in the following.

Layer 1: 1
Layer 2: 1-1 to 1-4
Layer 3: 1-1-1 to 1-1-4
Layer 4: 1-1-1-1 to 1-1-1-4

In this example, although the meshes of which layer are used, in other words, the mesh size of the mesh for which the analyzed results are aggregated, varies in accordance with the size of the low-speed vehicle 10 which requests the electronic map, it can be understood that the mesh size of the mesh to be used can be specified by the number of digits (which will be referred to as a "mesh code length" as well) of the mesh code. For example, when the obstacle data is provided by the mesh size of the layer 3, the mesh code length becomes three digits (1-1-1 to 1-1-4). The aggregating unit 43 aggregates the analyzed results to the mesh of the mesh size determined by this mesh code length.

Further, when dividing each of the meshes of the layer 1, the mesh generation unit 46 associates coordinate of each of the generated meshes with its mesh code. First, coordinates of diagonal corners of the mesh of the layer 1 are known from the map DB 493, and these coordinates are assumed as (La 1, Lo 1) and (La 1+H, Lo 1+W), for example. Here, "W" means a length of the mesh of the layer 1 in a longitude direction, and "H" means a length of the mesh of the layer 1 in a latitude direction. As the meshes of the layer 2 are obtained by dividing the mesh of the layer 1 by two in the longitude direction and the latitude direction, respectively, the coordinate of each of the meshes of the layer 2 can be easily obtained by calculation. Then, the mesh generation unit 46 may associate the coordinate of each of the meshes of each of the layers with the mesh code.

Mesh code 1: (La 1, Lo 1) (La 1+W, Lo 1+W)
Mesh code 1-1: (La 1, Lo 1) (La 1+H/2, Lo 1+W/2)
Mesh code 1-1-1: (La 1, Lo 1) (La 1+H/4, Lo 1+W/4)
Mesh code 1-1-1-1: (La 1, Lo 1)(La 1+H/8, Lo 1+W/8)

Thus, when the positional data is obtained, corresponding mesh code can be determined. The mesh generation unit 46 notifies the association of the coordinate of each of the meshes of each of the layers with the mesh code to the aggregating unit 43. Alternatively, the aggregating unit 43 may be configured to refer to the association of the coordinate of each of the meshes of each of the layers with the mesh code. With this, upon obtaining the positional data from which the electronic map is requested, the aggregating unit 43 can convert the positional data to the mesh code, and register the obstacle data aggregated for each of the meshes in the obstacle point DB 492 in association with the mesh code.

(Determination of Mesh Size in Electronic Map)

Figure 17:
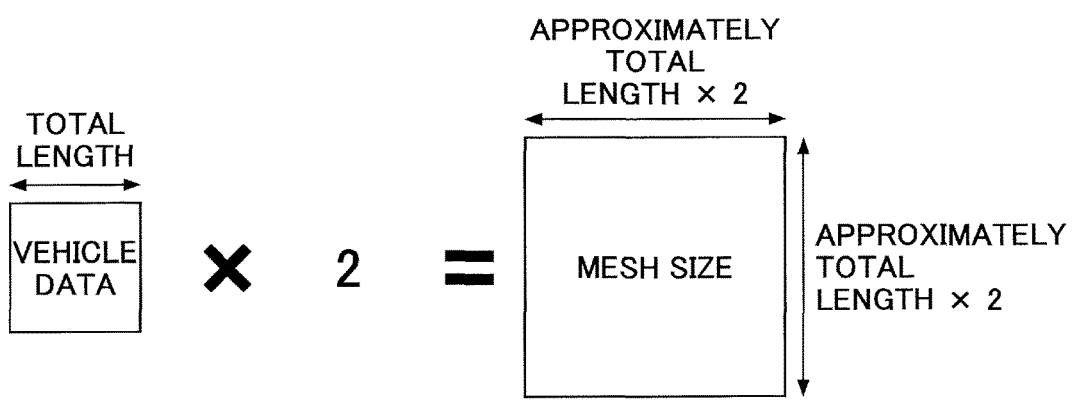
FIG. 17 is a view for describing an example of a method of determining a mesh size from a total length included in vehicle data.

Next, a method of determining a mesh size based on the size of the low-speed vehicle 10 is described with reference to FIG. 17. FIG. 17 is a view for describing the method of determining the mesh size from the total length included in the vehicle data. As illustrated in FIG. 17, the mesh size determining unit 45 determines a value obtained by multiplying the total length included in the vehicle data by two as the mesh size. Here, the total length means a longer side of the respective vehicle selected from a length and a width, among the length, the width and a height included in the vehicle data. As the height does not relate to an area that occupies the ground surface so much, the height is not used. Here, the low-speed vehicle 10 may send only the total length as the vehicle data. Further, the low-speed vehicle 10 may send vehicle type data to the server 40 as the vehicle data, and the server 40 may convert the vehicle type to the total length by referring to a table in which the vehicle type and the total length are associated with each other.

As the twice of the total length does not necessarily become a multiple of the minimum mesh size described above with reference to FIG. 16, the mesh size determining unit 45 determines the mesh size that is nearest to the twice of the total length as a mesh size to be used. Alternatively, the mesh size determining unit 45 may determine the mesh size that is greater than the twice of the total length and also nearest to the twice of the total length, or the mesh size that is smaller than the twice of the total length and also nearest to the twice of the total length as the mesh size to be used. With this, the mesh size determining unit 45 can determine the mesh size (and also the mesh code length) of either one of the layers 1 to 4 of FIG. 16 as the mesh size to be used.

Here, multiplying the total length by two is just an example, and the total length may be multiplied by an integer that is larger than two (three times to 10 times, and the like). Further, the mesh size may be determined not only by the total length, but may be determined by considering a two-dimensional area (length*width) of the vehicle, for example, by a function of the area.

(Registration of Obstacle Data)

The aggregating unit 43 converts the positional data of the low-speed vehicle 10 to the mesh code by the mesh code length determined by the mesh size determining unit 45. For example, when the mesh size of the layer 3 is determined to be used, the aggregating unit 43 converts the positional data of the low-speed vehicle 10 to some mesh codes (1-1-1 to 1-1-4, for example) of three digits, corresponding to some meshes that are displayed on a display around the position determined based on the positional data of the low-speed vehicle 10. This means that the aggregating unit 43 aggregates the obstacle data around the low-speed vehicle 10 to each of the meshes corresponding to the mesh code lengths of the layer 3. For the conversion, coordinates that are associated with mesh codes of three digits may be referred to. Then, the aggregating unit 43 obtains the analyzed results included in the mesh specified by such a mesh code from the analyzed result DB 491, and generates the obstacle data for each of the meshes. Further, the aggregating unit 43 registers the obstacle data in association with the respective mesh code in the obstacle point DB 492.

Here, hypothetically, if the mesh size itself is designated by the mesh size determining unit 45, it is necessary to divide the meshes again. However, according to the example, as the mesh code length of the already divided meshes is designated, meshes of an appropriate mesh size can be specified. Further, as the meshes are previously divided to the minimum size, even when the low-speed vehicle 10 of any size requests the electronic map, the aggregating unit 43 can generate the obstacle data for each of the meshes, whose size is approximately the twice of the total length of the target low-low-speed vehicle 10.

(Operation Steps)

Figure 18:
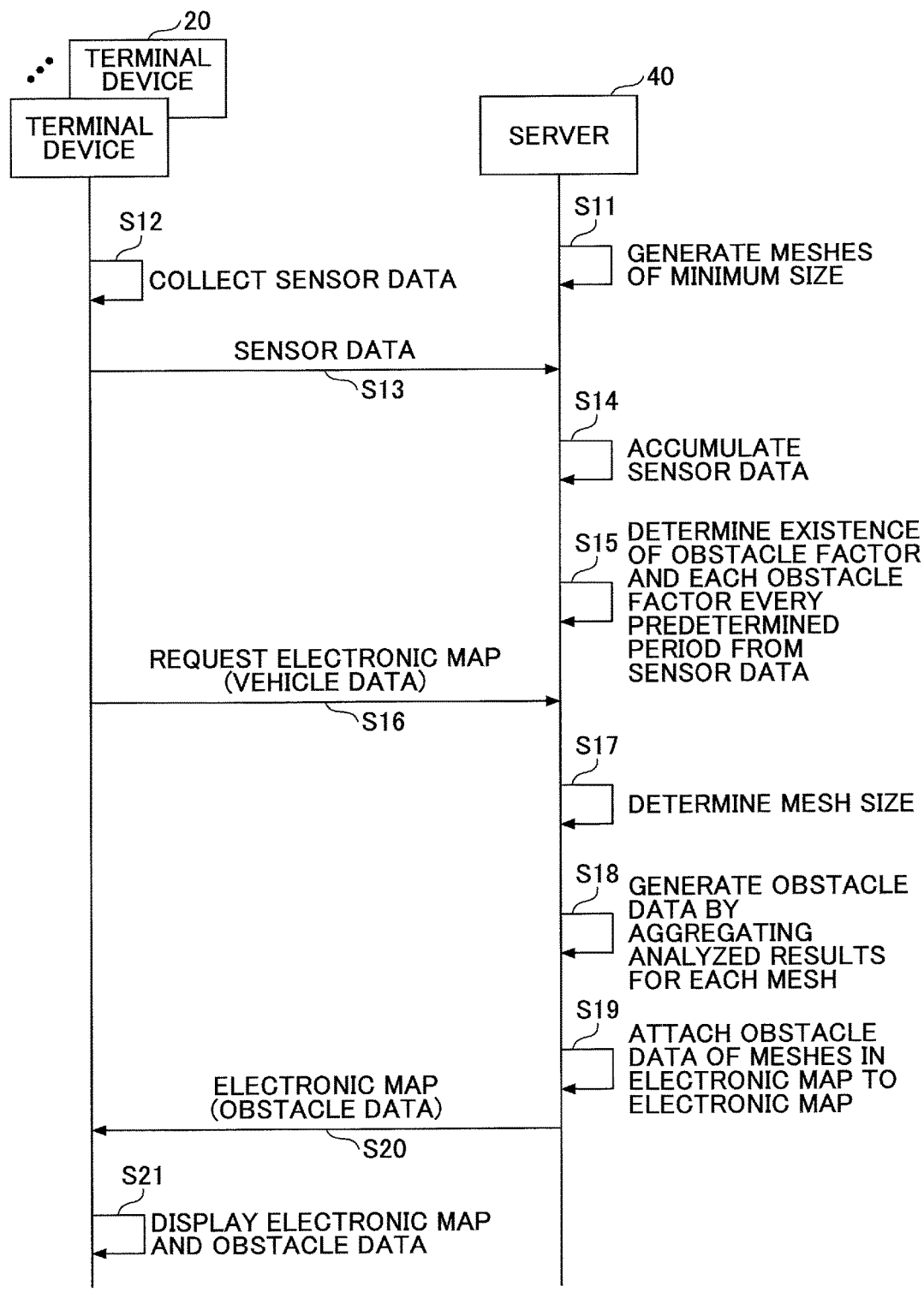
FIG. 18 is a sequence diagram illustrating an example of a flow of the entire operation of the obstacle data providing system.

FIG. 18 is a sequence diagram illustrating an example of a total operation of the obstacle data providing system 100 of the embodiment. In the description of FIG. 18, different points from FIG. 12 are mainly described.

S11: The mesh generation unit 46 of the server 40 previously generates meshes of a minimum size. As described above, as the map data of the map DB 493 is already divided into meshes of a certain size, the mesh generation unit 46 may further divide the meshes. Here, generation of the meshes of the minimum size may be performed once.

Processes of next steps S12 to S15 may be performed similarly as the processes of steps S1 to S4 of FIG. 12. Further, as the obstacle data is not generated until the electronic map is requested in this example, as a next process, a request of the electronic map of step S16 is performed.

S16: The electronic map obtaining unit 23 of the terminal device 20 requests the server 40 for the electronic map at desired timing. The request for the electronic map may include positional data and vehicle data of the low-speed vehicle 10.

S17: The mesh size determining unit 45 of the server 40 determines a mesh size based on a total length of the low-speed vehicle 10 included in the vehicle data. The mesh size determining unit 45 sends a mesh code length corresponding to the mesh size and the positional data to the aggregating unit 43.

S18: The aggregating unit 43 converts the positional data of the low-speed vehicle 10 to mesh codes of the notified mesh code length. As this time, the aggregating unit 43 specifies a plurality of mesh codes of a plurality of meshes (the meshes included in a display area of a display) around the positional data as a center. Then, the aggregating unit 43 aggregates the analyzed results for each of the meshes specified by the mesh codes, respectively, to generate a plurality of obstacle data, and registers the obstacle data in association with the mesh codes, respectively, in the obstacle point DB 492. A method of generating the obstacle data may be the same as that of example 1. The mesh code registered in the obstacle point DB 492 has the number of digits corresponding to the mesh code length determined by the mesh size determining unit 45. In other words, it is unnecessary to designate the mesh code of the minimum size.

S19: Next, the map generation unit 44 of the server 40 generates an electronic map of the display area of the display, similarly as example 1, reads out the obstacle data of the mesh codes specified by the positional data from the obstacle point DB 492, and attaches then to the electronic map.

Processes of steps S20 and S21 may be the same as the processes of steps S8 and S9 of FIG. 12.

(Display Example of Obstacle Data in Mesh of Mesh Size Corresponding to Size of Low-Speed Vehicle)

Figure 19B:
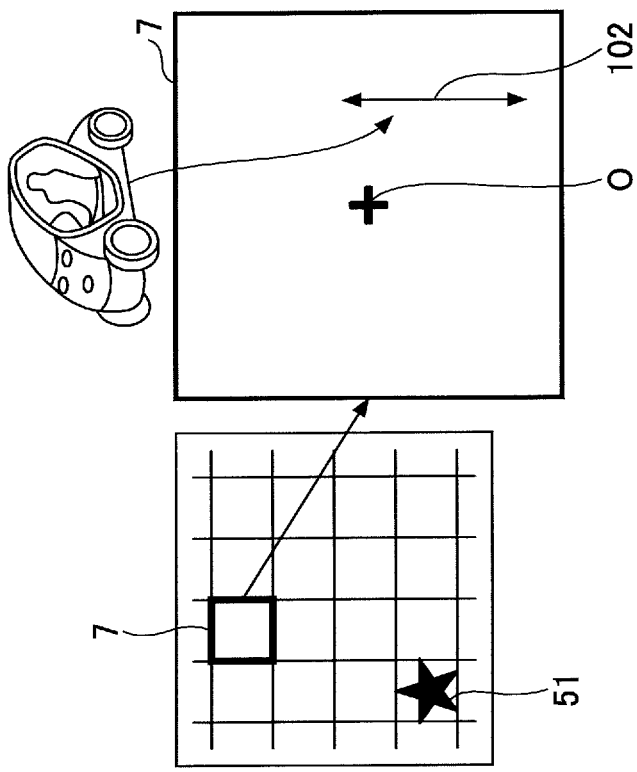
FIG. 19A and FIG. 19B are views schematically illustrating a display example of obstacle data in a mesh of a size determined in accordance with a size of a low-speed vehicle, respectively.
Figure 19A:
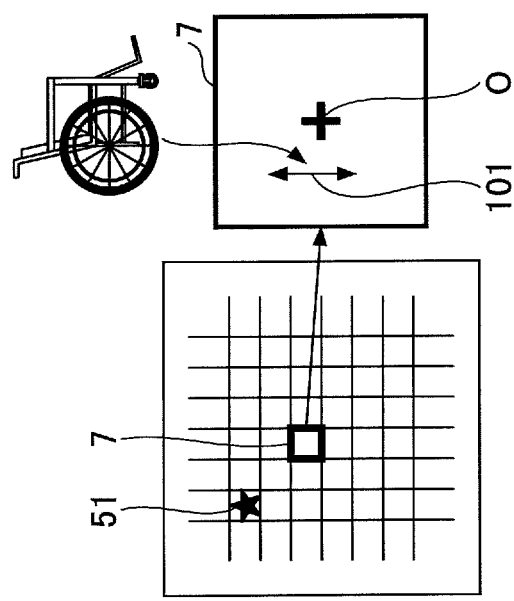

FIG. 19A and FIG. 19B are views schematically illustrating a display example of the obstacle data in the mesh 7 of a size determined in accordance with the size of the low-speed vehicle 10. FIG. 19A illustrates a display example of the obstacle data when the low-speed vehicle 10 of a small size requests to display the electronic map. Each of the meshes 7 of FIG. 19A has a mesh size equal to or slightly larger than the minimum size. As the mesh size is not so large with respect to the size of the low-speed vehicle 10, a position where each of the obstacle factors exists and a position at which the obstacle data exists displayed on the map are not so different, and lowering of reliability of the obstacle data can be suppressed. Further, the tendency that a plurality of different obstacle factors are aggregated to one mesh is lowered, and the obstacle data provided to the user is not so complicated.

FIG. 19B illustrates a display example of the obstacle data when the low-speed vehicle 10 of a large size requests to display the electronic map. Each of the meshes 7 of FIG. 19B has a mesh size equal to three to four or more of the meshes of the minimum size. In such a case, the number of the obstacle factors included in each of the meshes 7 would be sufficient, and lowering of reliability of the analyzed result can be suppressed.

(Summary)

As described above, the obstacle data providing system 100 of the example can suppress lowering of reliability of the obstacle data by appropriately determining a mesh size for aggregating the analyzed results in accordance with a size of the low-speed vehicle 10.

Here, in this example, it is also effective that the server 40 obtains the vehicle data when registering the sensor data, and registers the analyzed results for each of the vehicle data. As the mesh size can be determined in accordance with the size of the low-speed vehicle 10 which sends the sensor data, similar to example 1, the obstacle data can be registered for each of the meshes in the obstacle point DB 492 at the time when the sensor data is sent. In other words, a plurality of the obstacle point DBs 492 are prepared for the sizes of the low-speed vehicle 10, respectively. When the electronic map is requested, the obstacle data is provided from the obstacle point DB 492 corresponding to the size of the low-speed vehicle 10 that has requested the electronic map.

(Other Applicable Examples)

Although a preferred embodiment of the obstacle data providing system, the data processing apparatus and the method of providing obstacle data has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

For example, although the obstacle data is associated with each of the meshes in this embodiment, the obstacle data may be associated with a link. The link means a line segment that expresses a road connecting nodes in a road network, road. When the low-speed vehicle 10 is a wheel chair, as the wheel chair travels on a walkway, the server 40 may associate a detected position of the sensor data with a link expressing a walkway. With this configuration, it is possible to generate obstacle data for each of the links.

In this case, a pin icon 51 is also displayed on a link (at a center of the link, for example). With this, a user can know whether the pin icon 51 exists on a walkway to pass. Then, it is easier for the user to determine whether to pass the link at which the pin icon 51 is provided.

When the user searches a route, the terminal device 20 may only display the pin icons 51 on the displayed route. With this, it is easier for the user to know obstacle factors on the route. Further, the terminal device 20 may be configured to request the server 40 to provide a route that can avoid the link on the route at which the pin icon 51 exists. With this, the user can obtain a route that avoids obstacle factors. At this time, the user may input a type of the obstacle factor for which the user wants to avoid in the terminal device 20. Then, the server 40 searches a route that can avoid the link including the type of the obstacle factor input by the user among the obstacle data on the route.

Further, although it is described in the embodiment that the mesh size of the meshes are equal, the mesh size of the meshes may not be equal. For example, the server 40 may repeat a process of dividing the mesh into two meshes or four meshes every time the number of analyzed results exceeds a threshold value. With this configuration, at a place where the number of analyzed results is large, localized obstacle data can be obtained.

Further, although it is described in the embodiment that the terminal device 20 includes sensors for detecting obstacles, the sensors may be separately provided from the terminal device 20. In such a case, each of the sensors and the terminal device 20 may communicate via a wire communication or a wireless communication. Alternatively, the sensor may directly send sensor data to the server.

Further, blocks of the structure illustrated in FIG. 3 are just an example to facilitate understanding of the processes by the terminal device 20 and the server 40 by dividing based on main functions. Thus, the present invention is not limited by a way of dividing process units, or a name of each of the blocks. The processes of the terminal device 20 and the server 40 may be further divided into more numbers of process units in accordance with the content of the processes. Further, the processes may be divided such that a single process unit includes more processes.

Further, the databases included in the server 40 may be dispersedly provided in a plurality of data processing apparatuses, respectively. Further, although the single server 40 is illustrated in FIG. 2 and FIG. 3, a plurality of the servers 40 may be provided. Further, functions of the server 40 may be dispersedly provided in a plurality of servers.

Here, the obstacle point DB 492 is an example of an obstacle data storage unit, the map generation unit 44 is an example of an electronic data providing unit, the electronic map obtaining unit 23 is an example of a receiving unit, the screen display unit 24 is an example of a display unit, the operation accepting unit 25 is an example of an accepting unit, the aggregating unit 43 is an example of an aggregating unit, and the obstacle point DB 492 is an example of an obstacle data storage unit. The sensor data sending unit 22 is an example of a sending unit, and the sensor data receiving unit 41 is an example of a data receiving unit. The mesh size determining unit 45 is an example of a mesh size determining unit, the mesh generation unit 46 is an example of a mesh dividing unit, and the map DB 493 is an example of a map data storage unit.

An obstacle data providing system that provides obstacle data regarding multiple obstacle factors can be provided.

What is claimed is:

1. An obstacle data providing system comprising:
 a data processing apparatus that includes an electronic data providing unit that
  refers to an obstacle data storage unit that stores obstacle data generated by synthesizing a plurality of obstacle factors each of which becomes an obstacle in travelling of a low-speed vehicle, said plurality of obstacle factors including at least two or more selected from a group including a step, a vertical inclination, a lateral inclination, a narrow road and an irregularity of a road surface, and
  sends, upon receiving a request for an electronic map from a terminal device, the obstacle data to the terminal device with an electronic map via a network; and
 the terminal device that includes
  a receiving unit that receives the electronic map and the obstacle data, and
  a display unit that displays the obstacle data with the electronic map, received by the receiving unit, on a display,
 wherein the obstacle data includes difficulty data in travelling of the low-speed vehicle calculated based on the plurality of obstacle factors, and
 wherein the display unit displays a notice indicating an existence of the obstacle data in a configuration corresponding to a size of the difficulty data in the electronic map.

2. The obstacle data providing system according to claim 1,
wherein the obstacle data is generated based on the plurality of obstacle factors within a predetermined range, and
wherein the display unit displays a single notice indicating an existence of the obstacle data for each of the predetermined ranges in the electronic map.

3. The obstacle data providing system according to claim 1,
wherein the terminal device includes an accepting unit that accepts an operation to the terminal device, and
wherein the display unit displays the difficulty data when the accepting unit accepts an operation to display a detail of the obstacle data.

4. The obstacle data providing system according to claim 3,
wherein the obstacle data includes a contribution ratio to the difficulty data for each of the plurality of obstacle factors, and
wherein the display unit displays the obstacle factor whose contribution ratio is the largest when the accepting unit accepts an operation to display the detail of the obstacle data.

5. The obstacle data providing system according to claim 4,
wherein the obstacle data includes a height of the step, an angle of the vertical inclination, an angle of the lateral inclination and a type of a road surface of the irregularity of the road surface.

6. The obstacle data providing system according to claim 5,
wherein when the obstacle factor whose contribution ratio is the largest is the step, the vertical inclination or the lateral inclination, and when the accepting unit accepts an operation to display the detail of the obstacle data, the display unit displays the obstacle factor whose contribution ratio is the largest and a height of the step, and angle of the vertical inclination or an angle of the lateral inclination with the obstacle factor whose contribution ratio is the largest.

7. The obstacle data providing system according to claim 5, wherein when the obstacle factor whose contribution ratio is the largest is the irregularity of the road surface, and when the accepting unit accepts an operation to display the detail of the obstacle data, the display unit displays the obstacle factor whose contribution ratio is the largest with the type of the road surface.

8. The obstacle data providing system according to claim 1,
wherein the terminal device includes
a sensor for detecting data regarding travelling of the low-speed vehicle, and
a sending unit that sends the data regarding travelling of the low-speed vehicle detected by the sensor to the data processing apparatus, and
wherein the data processing apparatus
includes a data receiving unit that receives the data regarding the travelling of the low-speed vehicle, and
generates the obstacle data by analyzing the data regarding the travelling of the low-speed vehicle.

9. The obstacle data providing system according to claim 1,
wherein the data processing apparatus includes an aggregating unit that performs, for each of the predetermined ranges,
accumulating sensor data regarding a height of a step, an angle of a vertical inclination, an angle of a lateral inclination and a type of a road surface obtained from a terminal device that travels the respective predetermined range,
calculating an average value of the heights of the steps, an average value of the angles of the vertical inclinations, an average value of the angles of the lateral inclination and a number of detected times of each of the types of the road surfaces,
obtaining a normalized value of each of the average value of the heights of the steps, the average value of the angles of the vertical inclinations, the average value of the angles of the lateral inclination and the number of detected times of each of the types of the road surfaces, and
calculating a value as the difficulty data obtained by multiplying each of the normalized values by the number of detected times of the respective obstacle factor, adding the multiplied results to obtain a sum, and dividing the sum by the number of detected times of all of the obstacle factors.

10. The obstacle data providing system according to claim 1, wherein the data processing apparatus includes
a mesh size determining unit that obtains the request for the electronic map from the terminal device with data regarding a size of the terminal device, and determines a mesh size of meshes, for each of which the plurality of obstacle factors are synthesized, in accordance with the size of the terminal device, and
an aggregating unit that generates the obstacle data for each of the meshes of the mesh size determined by the mesh size determining unit by aggregating analyzed results of data regarding travelling of the low-speed vehicle included in the respective mesh.

11. The obstacle data providing system according to claim 10, further comprising:
a mesh dividing unit that equally divides each of meshes of map data, previously stored in a map data storage unit, to classify into layers corresponding to the divided number, and gives identification data to each of the meshes of each of the layers, the identification data having the number of digits corresponding to the layer in which the respective mesh is classified,
wherein the mesh size determining unit notifies the number of digits corresponding to the layer in which meshes of a size that is nearest to the determined mesh size, to the aggregating unit, and
wherein the aggregating unit aggregates the analyzed results of the data regarding the travelling of the low-speed vehicle around the low-speed vehicle for each of the meshes of the mesh size corresponding to the number of digits.

12. A data processing apparatus comprising:
an electronic data providing unit that
refers to an obstacle data storage unit that stores obstacle data generated by synthesizing a plurality of obstacle factors each of which becomes an obstacle in travelling of a low-speed vehicle, said plurality of obstacle factors including at least two or more selected from a group including a step, a vertical inclination, a lateral inclination, a narrow road and an irregularity of a road surface, and
sends, upon receiving a request for an electronic map from a terminal device, the obstacle data to the terminal device with an electronic map via a network, wherein the obstacle data includes difficulty data in travelling of the low-speed vehicle calculated based on the plurality of obstacle factors, and wherein the terminal device includes a display unit configured to display a notice indicating an existence of the obstacle data in a configuration corresponding to a size of the difficulty data in the electronic map.

13. A method of providing obstacle data performed by an obstacle data providing system including a terminal device and a data processing apparatus that provides an electronic map to the terminal device via a network, the method comprising:

referring to an obstacle data storage unit that stores obstacle data generated by synthesizing a plurality of obstacle factors each of which becomes an obstacle in travelling of a low-speed vehicle, said plurality of obstacle factors including at least two or more selected from a group including a step, a vertical inclination, a lateral inclination, a narrow road and an irregularity of a road surface, and sending, upon receiving a request for an electronic map from the terminal device, the obstacle data to the terminal device with an electronic map via the network, performed by an electronic data providing unit of the data processing apparatus;

receiving the electronic map and the obstacle data, performed by a receiving unit of the terminal device; and displaying the obstacle data with the electronic map, received by the receiving unit, on a display, performed by a display unit of the terminal device, wherein the obstacle data includes difficulty data in travelling of the low-speed vehicle calculated based on the plurality of obstacle factors, and wherein the method further comprises displaying, by the display unit, a notice indicating an existence of the obstacle data in a configuration corresponding to a size of the difficulty data in the electronic map.

* * * * *